(12) United States Patent
Lu et al.

(10) Patent No.: US 11,872,173 B2
(45) Date of Patent: Jan. 16, 2024

(54) NURSING MACHINE HOST AND NURSING MACHINE TO WHICH SAME BELONGS

(71) Applicant: SUZHOU ALTON ELECTRICAL & MECHANICAL INDUSTRY CO., LTD., Jiangsu (CN)

(72) Inventors: Weidong Lu, Jiangsu (CN); Qiang Song, Jiangsu (CN); Xinxin Xu, Jiangsu (CN); Zhouen Li, Jiangsu (CN)

(73) Assignee: SUZHOU ALTON ELECTRICAL & MECHANICAL INDUSTRY CO., LTD., Jiangsu (CN)

( * ) Notice: Subject to any disclaimer, the term of this patent is extended or adjusted under 35 U.S.C. 154(b) by 412 days.

(21) Appl. No.: 17/292,391

(22) PCT Filed: Oct. 28, 2019

(86) PCT No.: PCT/CN2019/113655
§ 371 (c)(1),
(2) Date: May 7, 2021

(87) PCT Pub. No.: WO2020/093897
PCT Pub. Date: May 14, 2020

(65) Prior Publication Data
US 2021/0307983 A1 Oct. 7, 2021

(30) Foreign Application Priority Data
Nov. 8, 2018 (CN) .......................... 201811327035.0

(51) Int. Cl.
*A61G 9/02* (2006.01)
*C02F 1/32* (2023.01)

(52) U.S. Cl.
CPC .................. *A61G 9/02* (2013.01); *C02F 1/325* (2013.01); *C02F 2303/04* (2013.01)

(58) Field of Classification Search
CPC .............. A45D 19/04; A45D 19/06–12; A61F 5/451–4553; A61G 7/005; A61G 7/02;
(Continued)

(56) References Cited

U.S. PATENT DOCUMENTS 9,427,368 B2 * 8/2016 Lee ........................ A61G 9/006

FOREIGN PATENT DOCUMENTS

| CN | 102293702 A | 12/2011 |
| CN | 202892179 U | 4/2013 |

(Continued)

OTHER PUBLICATIONS

International Search Report for Application No. PCT/CN2019/113655, dated Jan. 23, 2020, 4 pages including English translation.

*Primary Examiner* — David P Angwin
*Assistant Examiner* — Nicholas A Ros
(74) *Attorney, Agent, or Firm* — Morgan, Lewis & Bockius LLP

(57) ABSTRACT

Provided is a main unit of a nursing machine, including a sewage bucket accommodating sewage, a water blocking device, a first water tank, a second water tank, a water pump, a first waterway, a second waterway, and a third waterway. The water blocking device includes a labyrinth-type channel communicating with a water storage cavity and a float accommodation cavity, and multiple division boards extending up and down to perform separation to form the labyrinth-type channel. The labyrinth-type channel is located between the water storage cavity and the float accommodation cavity, and communicates between the water storage cavity and the float accommodation cavity. The second water tank is provided with a first water inlet and a first water outlet. The water pump joins the third waterway.

20 Claims, 20 Drawing Sheets

(58) Field of Classification Search
CPC .......... A61G 7/047; A61G 9/00; A61G 9/003; A61G 9/02; A61G 9/006
See application file for complete search history.

(56) References Cited

FOREIGN PATENT DOCUMENTS

| | | | | |
|---|---|---|---|---|
| CN | 204293333 U | | 4/2015 | |
| CN | 109223290 A | | 1/2019 | |
| JP | 2002113052 A | | 4/2002 | |
| KR | 100880608 | * | 1/2009 | ............... A61G 9/00 |
| KR | 20090115296 | * | 11/2009 | ............... A61G 9/02 |

* cited by examiner

NURSING MACHINE HOST AND NURSING MACHINE TO WHICH SAME BELONGS

CROSS-REFERENCE TO RELATED APPLICATIONS

The present disclosure is a U.S. National Stage Application of PCT Application Serial No. PCT/CN2019/113655, filed Oct. 28, 2019, which claims priority to Chinese Patent Application No. 201811327035.0 filed Nov. 8, 2018 with the CNIPA, the disclosures of which are incorporated herein by reference in their entireties.

TECHNICAL FIELD

The present disclosure relates to the technical field of medical nursing instruments, in particular, a main unit of a nursing machine.

BACKGROUND

A nursing machine generally includes a wearable toilet collector and a main unit. A water supply pipeline and a sewage suction pipeline and the like are usually communicated between the toilet collector and the main unit. The toilet collector is provided with a toilet tank. The toilet collector is worn on the crotch of the human body for patients to discharge into the toilet tank. The main unit is usually provided with a negative pressure source providing suction power for sucking the sewage, a sewage bucket accommodating sewage, a clean water tank, and a water storage recess. The negative pressure source includes a motor and an impeller driven by the motor to rotate. The motor drives the impeller to rotate to generate the suction force. The process of sucking human excrement is roughly as follows: human discharges into the toilet tank of the toilet collector, the water supply pipeline supplies water to the toilet collector, the nozzle of the toilet collector flushes the human body and excrement, the negative pressure source performs suction, and the excrement and sewage in the toilet tank are sucked into the sewage bucket through the sewage suction pipeline along with the suction airflow; the water storage recess is usually used for accommodating heated water (warm water), the water in the water storage recess is usually supplied to a working head through the water supply pipeline to serve as the water source for flushing the human body and excrement, and the clean water tank usually accommodates clean unheated water (such as tap water); every time the human body and excrement are flushed, all or part of the water in the water storage recess is used; the clean water tank is used for replenishing the water storage recess, and when the water in the clean water tank is used up, the clean water tank may be taken out, refilled with water, and then put back into the main unit for use. In the existing art, the water tank configuration and the waterway between the water tanks of the nursing machine need to be optimized and improved.

SUMMARY

The present disclosure provides a main unit of a nursing machine with improved waterway utilization efficiency.

The present disclosure adopts the following solutions: a main unit of a nursing machine includes a first water tank, a second water tank, a water pump, a first waterway, a second waterway, and a third waterway. The second water tank is provided with a first water inlet and a first water outlet, and the water pump joins the third waterway, the water in the second water tank is able to sequentially flow through the first water outlet, the first waterway, the third waterway, and the first water inlet, and then flows back into the second water tank, and the water in the first water tank sequentially flows through the second waterway, the third waterway, and the first water inlet, and then flows into the second water tank.

With this design, the water in the second water tank may sequentially flow through the first water outlet, the first waterway, the third waterway, and the first water inlet, and then flow back into the second water tank. This belongs to the self-circulation of water in the second water tank (abbreviated as water self-circulation). The water in the first water tank may sequentially flow through the second waterway, the third waterway, and the first water inlet, and then flow into the second water tank. This belongs to the water replenishment from the first water tank to the second water tank (abbreviated as water replenishment). In the present disclosure, the third waterway may be shared by water self-circulation and water replenishment, thereby improving waterway utilization efficiency.

Further, the main unit of the nursing machine further includes a water shunt valve. The water shunt valve is provided with a second water inlet, a third water inlet, and a second water outlet. The first waterway is configured to fluidly communicate with the first water outlet and the second water inlet. The second waterway is configured to fluidly communicate with the first water tank and the third water inlet. The third waterway is configured to fluidly communicate with the second water outlet and the first water inlet. The water in the second water tank may sequentially flow through the first water outlet, the first waterway, the second water inlet, the second water outlet, the third waterway, and the first water inlet, and then flow back into the second water tank, and the water in the first water tank may sequentially flow through the second waterway, the third water inlet, the second water outlet, the third waterway, and the first water inlet, and then flow into the second water tank. The second water inlet and the third water inlet of the water shunt valve may be opened alternatively.

Further, the main unit of the nursing machine further includes a negative pressure source providing suction power for sucking the sewage, a sewage bucket accommodating sewage, a water blocking device, an air inlet pipeline communicating with the sewage bucket and the air inlet port of the water blocking device, and an air outlet pipeline communicating with the negative pressure source and the air outlet port of the water blocking device. The water blocking device includes a float capable of blocking the air outlet port, a water storage cavity, and a float accommodation cavity for accommodating the float. The air inlet port is vertically opposite to and located above the water storage cavity. The air outlet port is vertically opposite to and located above the float accommodation cavity. The water blocking device further includes a labyrinth-type channel communicating with the water storage cavity and the float accommodation cavity, and multiple division boards extending up and down to perform separation to form the labyrinth-type channel. The labyrinth-type channel is located between the water storage cavity and the float accommodation cavity, and communicates between the water storage cavity and the float accommodation cavity. The water storage cavity, the labyrinth-type channel, and the float accommodation cavity are juxtaposed with each other. The lower end of the float accommodation cavity is flush with the lower end of the labyrinth-type channel and the lower end of each division board. The water storage cavity extends downward beyond the labyrinth-type channel. The labyrinth-type channel is provided with a first interval, a second interval, and a third interval. The first interval, the second interval, and the third interval all extend up and down. The first interval, the second interval, and the third interval are formed by the intervals between different division boards, and the vertical projections of the first interval, the second interval, and the third interval on a first plane are completely staggered. The first plane is perpendicular to the left-and-right direction of the labyrinth-type channel. The sewage bucket is located behind the water blocking device and juxtaposed with the second water tank in a left-and-right direction of the second water tank. The first water tank is at least partially accommodated in the second water tank. The second water tank is further provided with a water storage space. The water storage space is located below the first water tank. The first water inlet and the first water outlet respectively communicate with the water storage space. The second waterway extends from the inside of the second water tank through the water storage space to the outside of the second water tank.

DETAILED DESCRIPTION

The solutions of embodiments of the present disclosure are explained and illustrated below in conjunction with the drawings of embodiments of the present disclosure, but the embodiments below are only preferred embodiments, not all, of the present disclosure. Based on the embodiments in the implementation manner, other embodiments obtained by those skilled in the art are within the scope of the present disclosure on the premise that no creative work is done.

Figure 1:
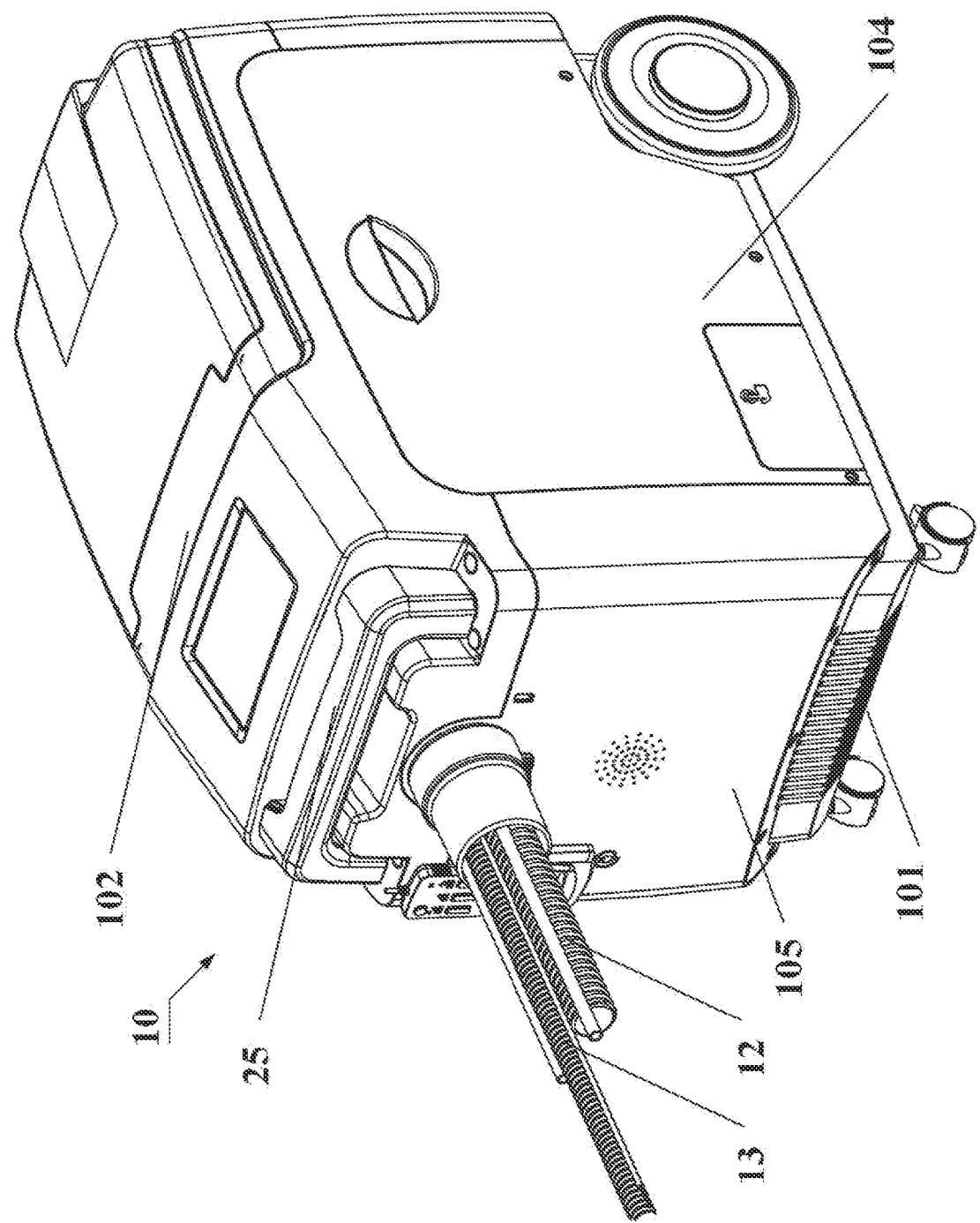
FIG. 1 is a perspective view of the main unit of this nursing machine.
Figure 2:
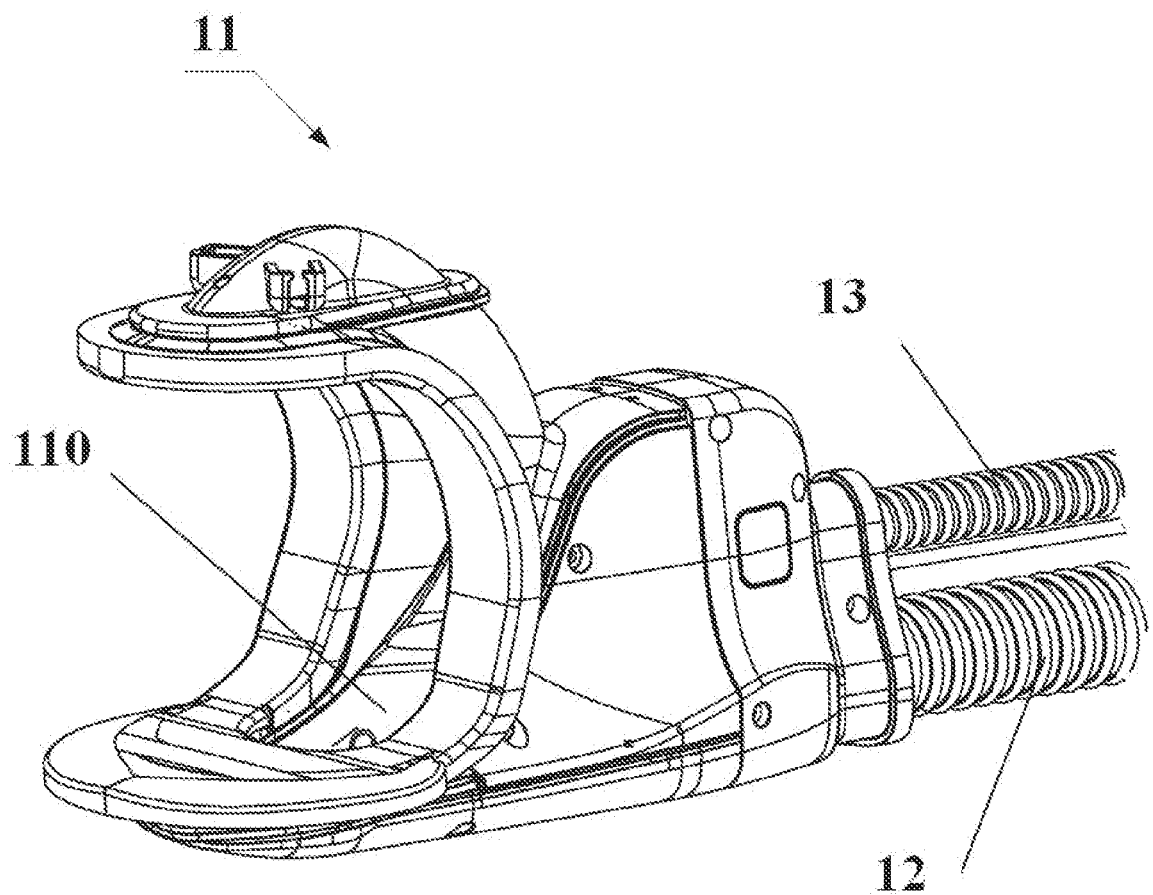
FIG. 2 is a perspective view of the toilet collector of this nursing machine.
Figure 3:
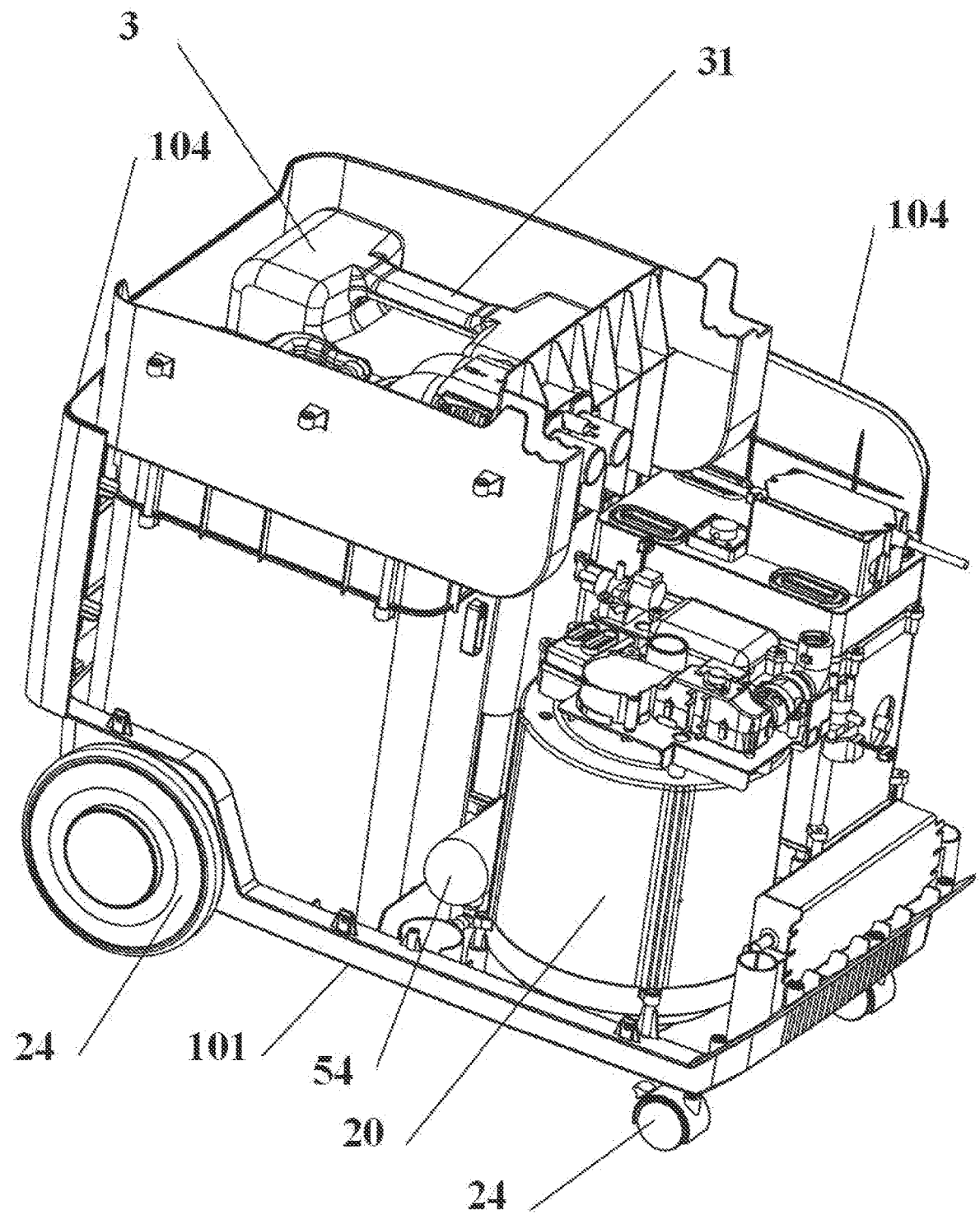
FIG. 3 is a perspective view of one angle of the main unit of this nursing machine of which the upper housing, left housing, front housing, and water blocking device are removed.
Figure 4:
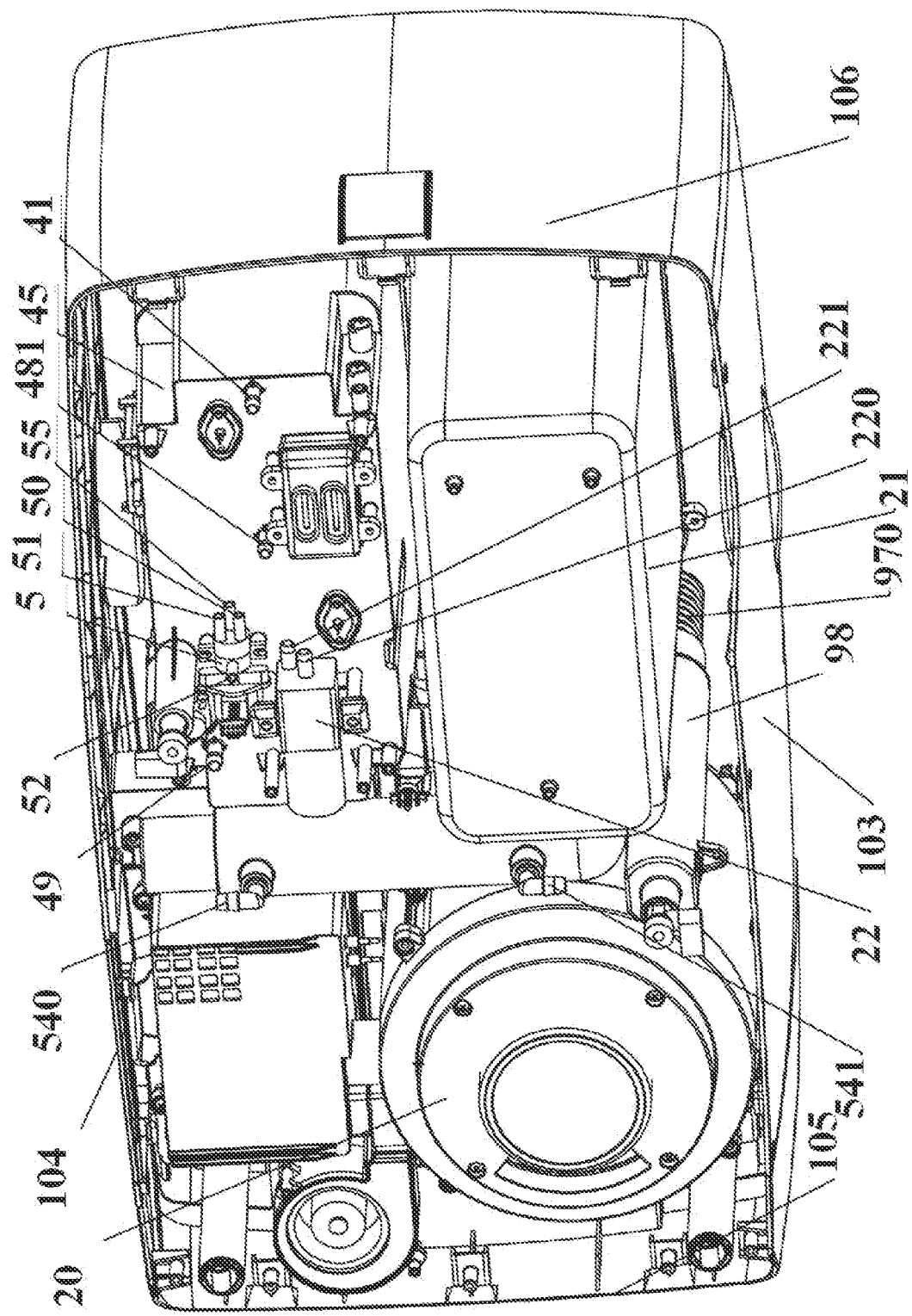
FIG. 4 is a bottom perspective view of the main unit of this nursing machine of which the chassis is removed.
Figure 5:
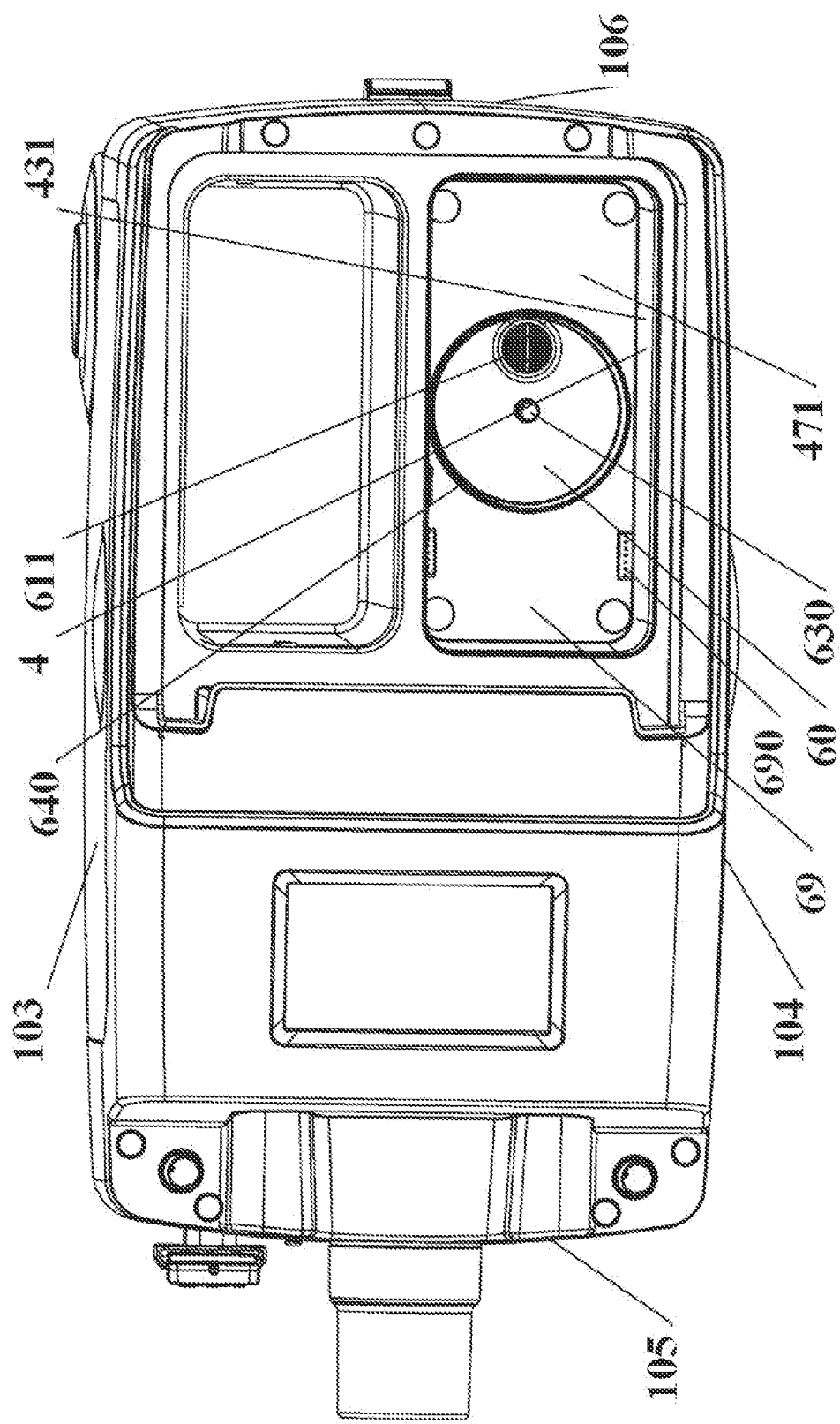
FIG. 5 is a top perspective view of the main unit of this nursing machine of which part of the upper housing and the first water tank are removed.
Figure 6:
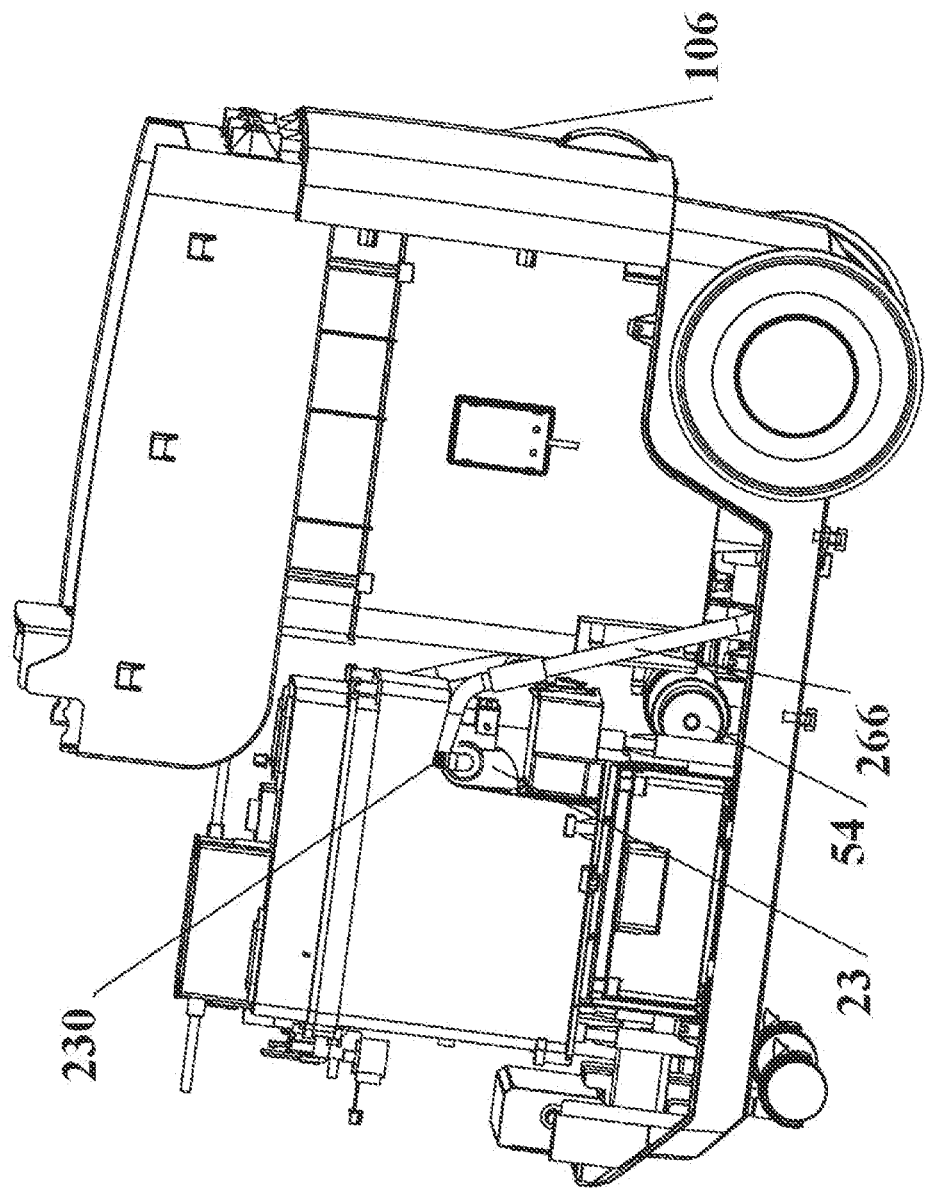
FIG. 6 is a perspective view of one angle of the main unit of this nursing machine of which the upper housing, left housing, right housing, and front housing are removed.
Figure 7:
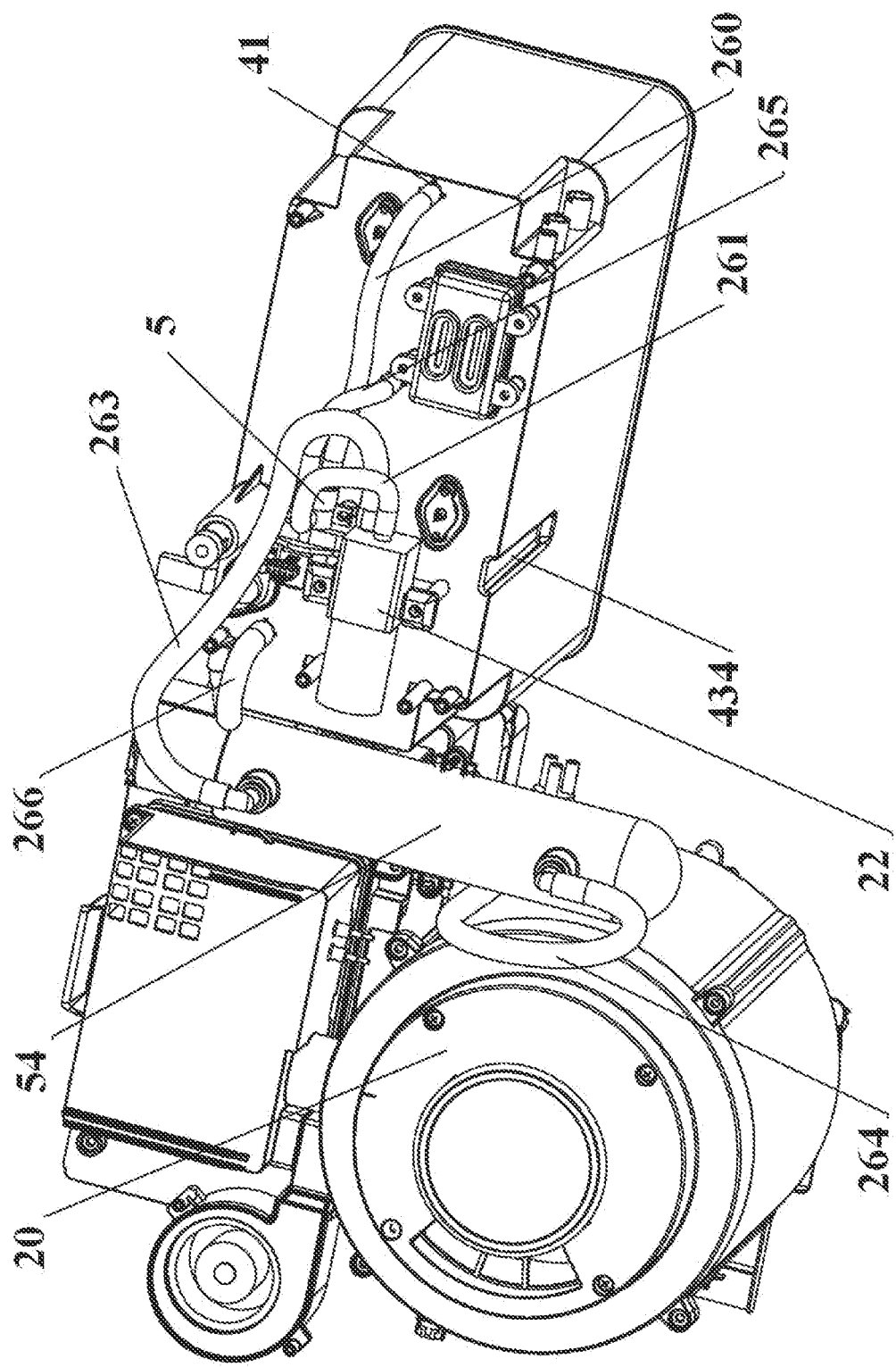
FIG. 7 is a bottom view of the combination of the second water tank, water pump, sterilizer, and water shunt valve of the main unit of this nursing machine.
Figure 8:
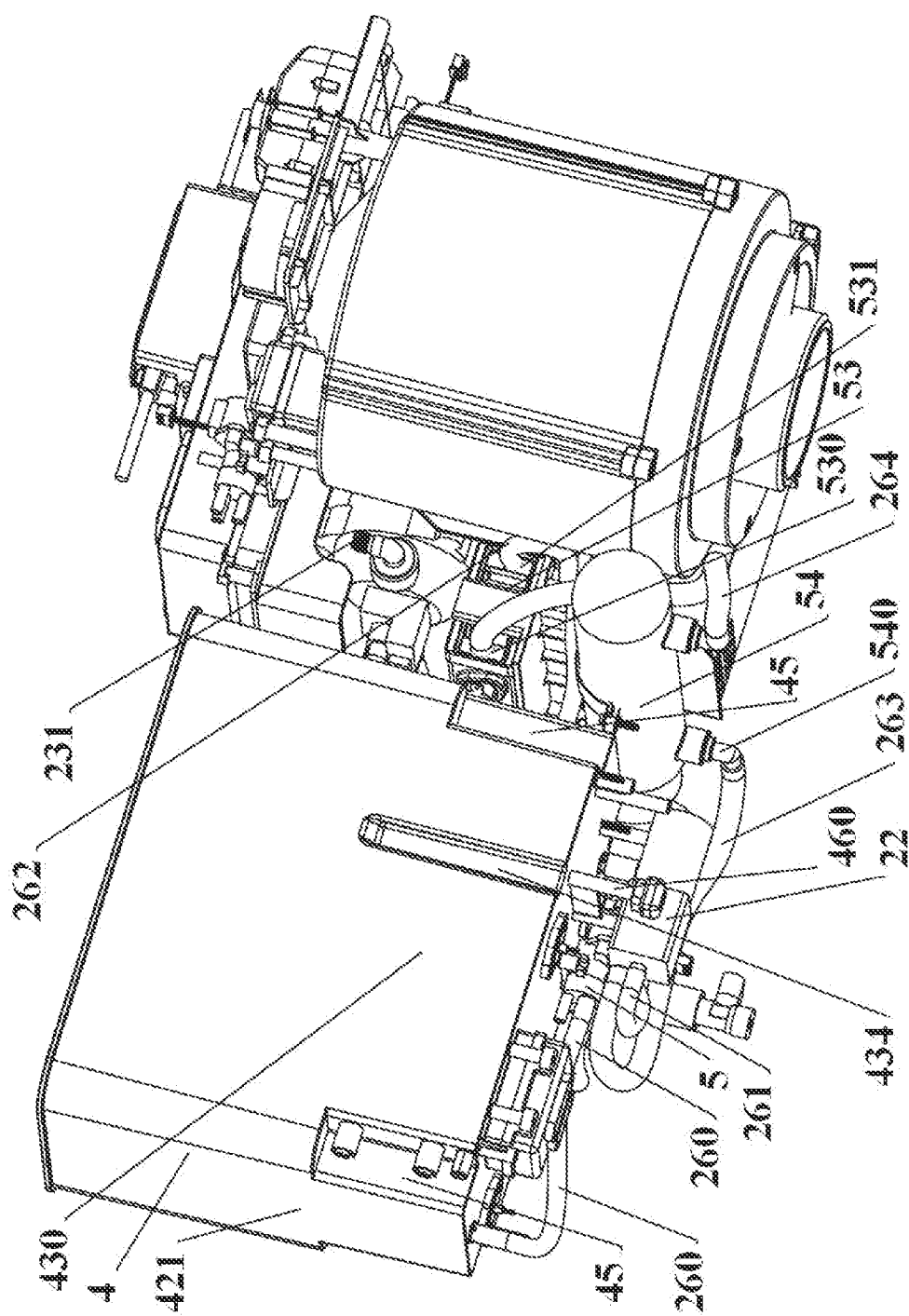
FIG. 8 is a side view of the combination of the second water tank, water pump, sterilizer, and water shunt valve of the main unit of this nursing machine.
Figure 9:
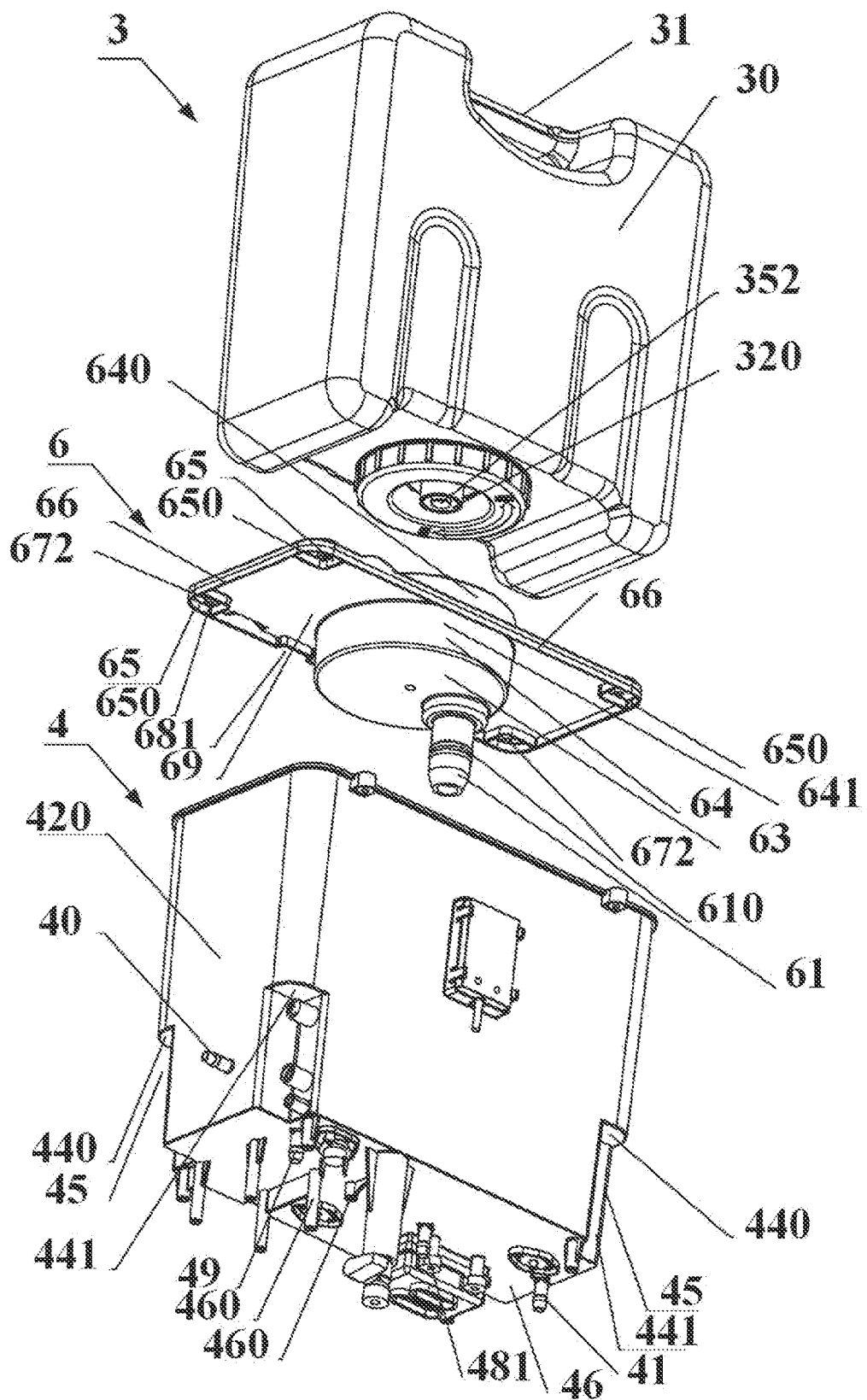
FIG. 9 is an exploded view of the first water tank, second water tank, and partition of the main unit of this nursing machine.
Figure 10:
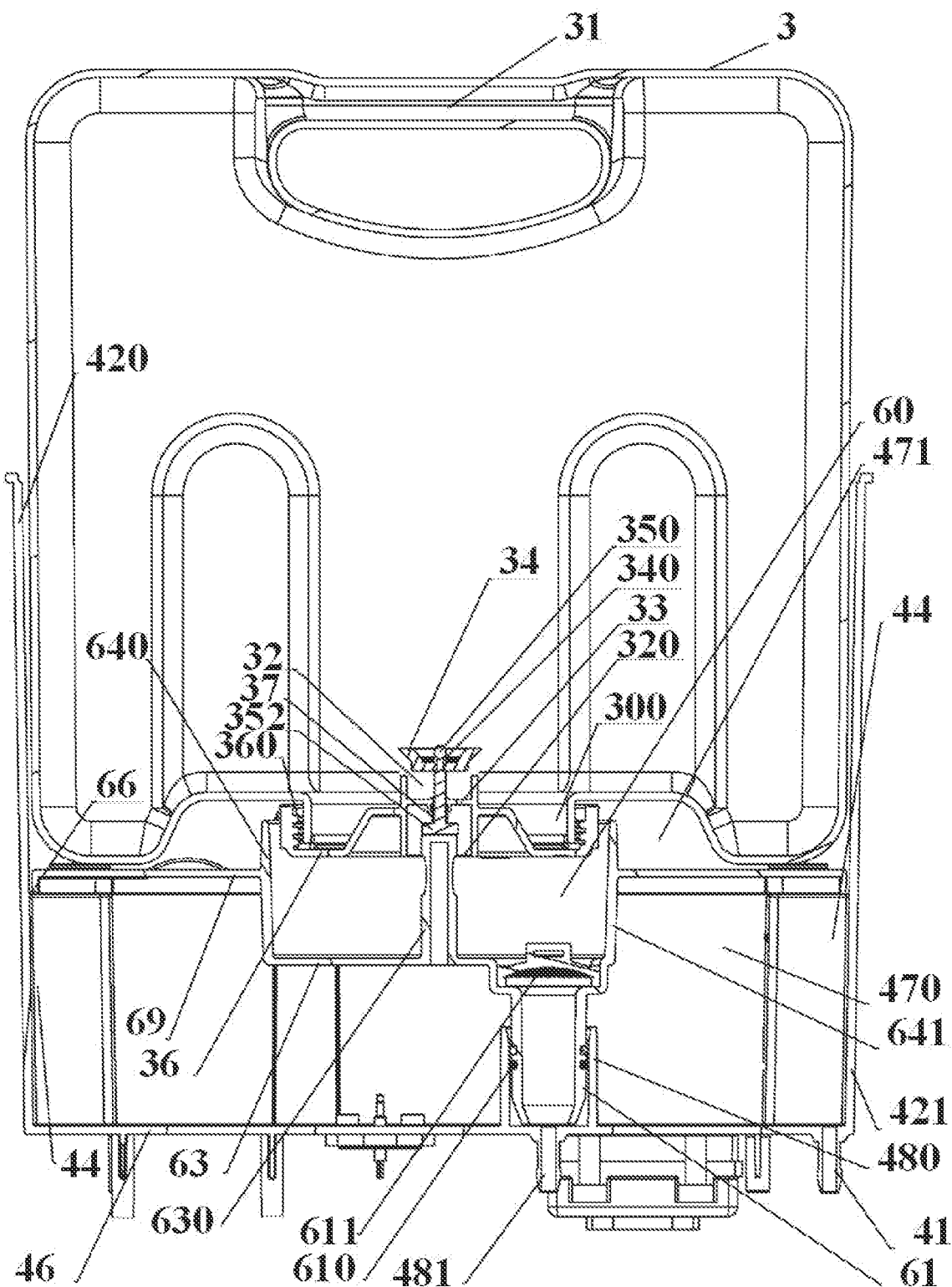
FIG. 10 is a longitudinal sectional view of the first water tank, second water tank, and partition of the main unit of this nursing machine.
Figure 11:
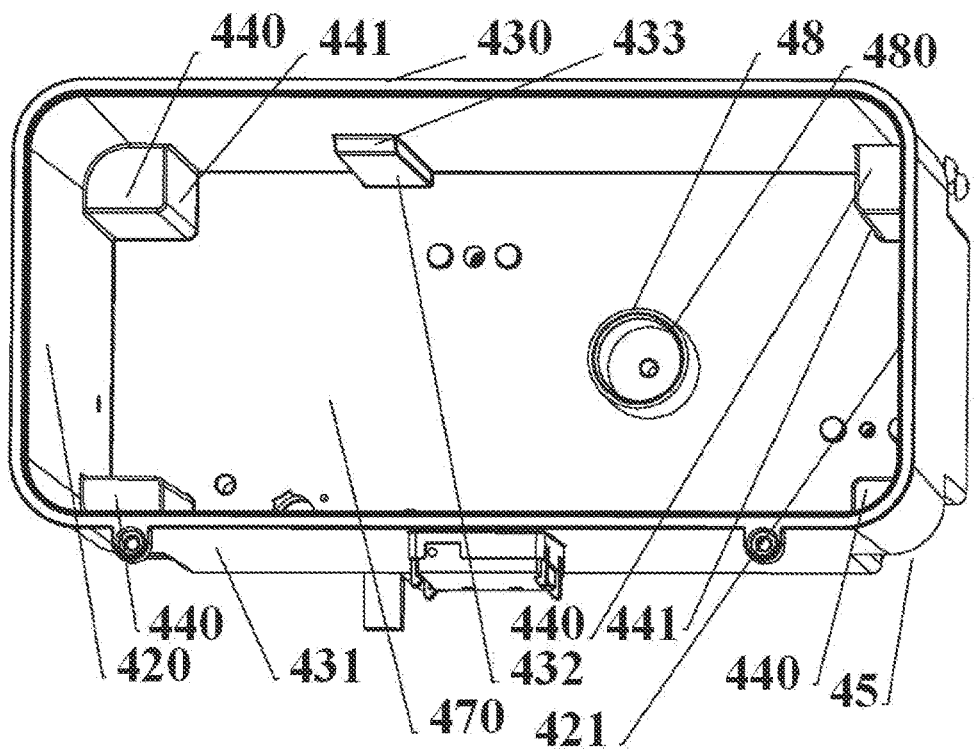
FIG. 11 is a perspective view of the second water tank of the main unit of this nursing machine.
Figure 12:
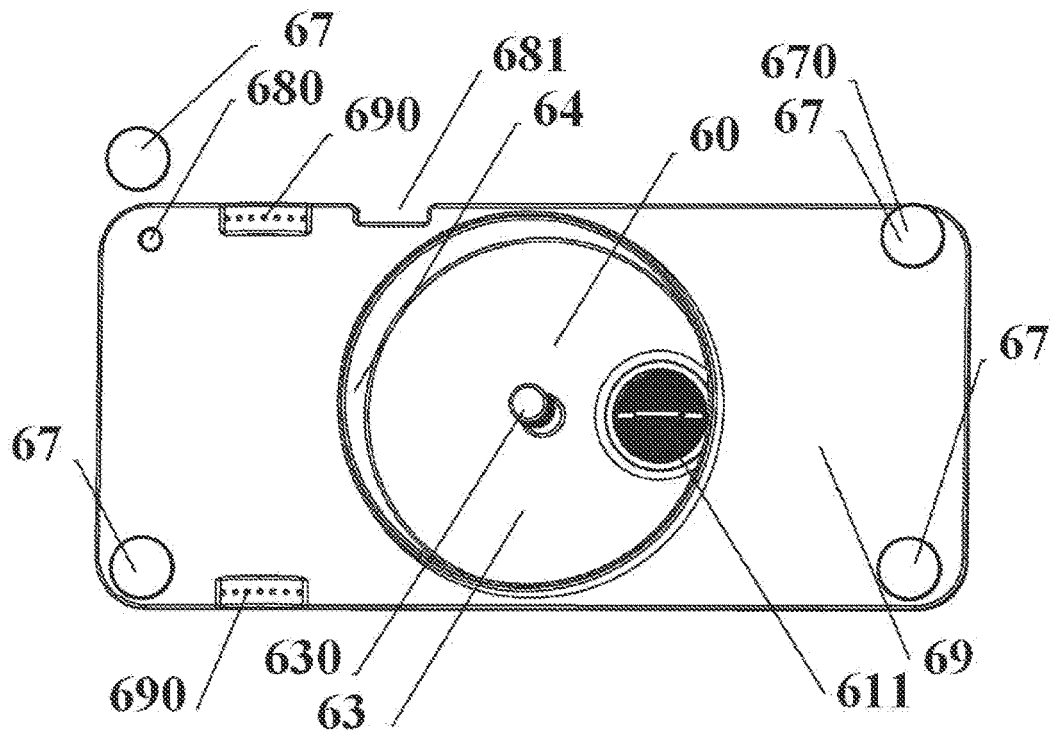
FIG. 12 is a perspective view of the partition of the main unit of this nursing machine.
Figure 13:
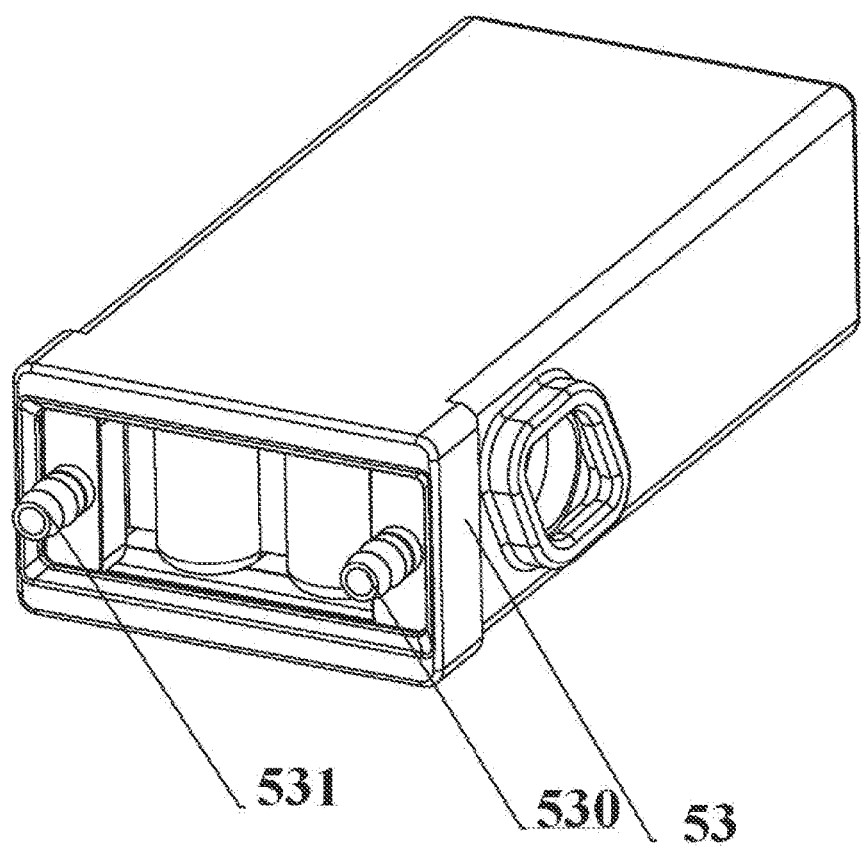
FIG. 13 is the schematic view of the heater of the main unit of this nursing machine.
Figure 14:
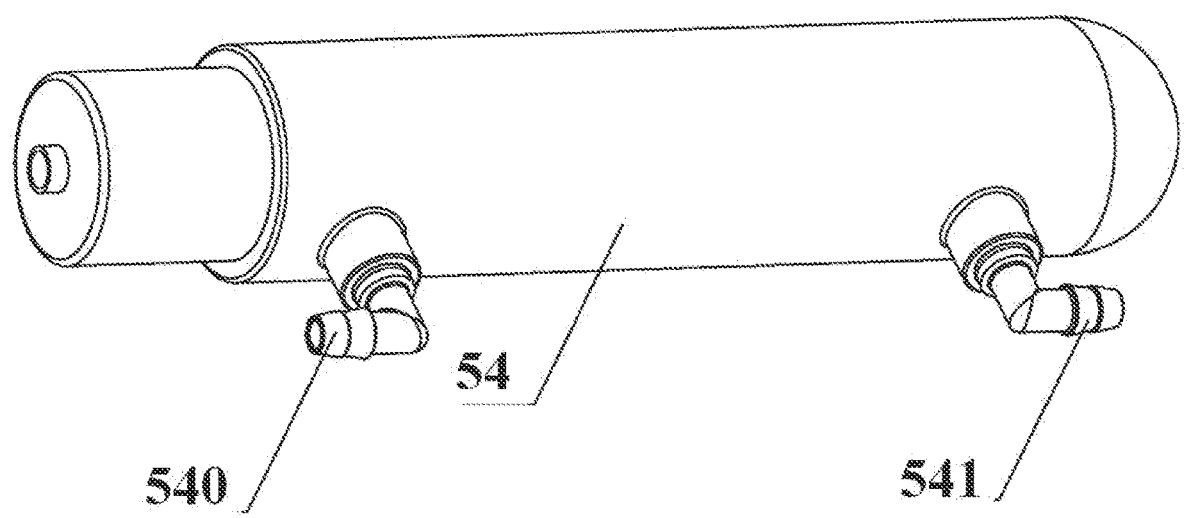
FIG. 14 is the schematic view of the sterilizer of the main unit of this nursing machine.
Figure 15:
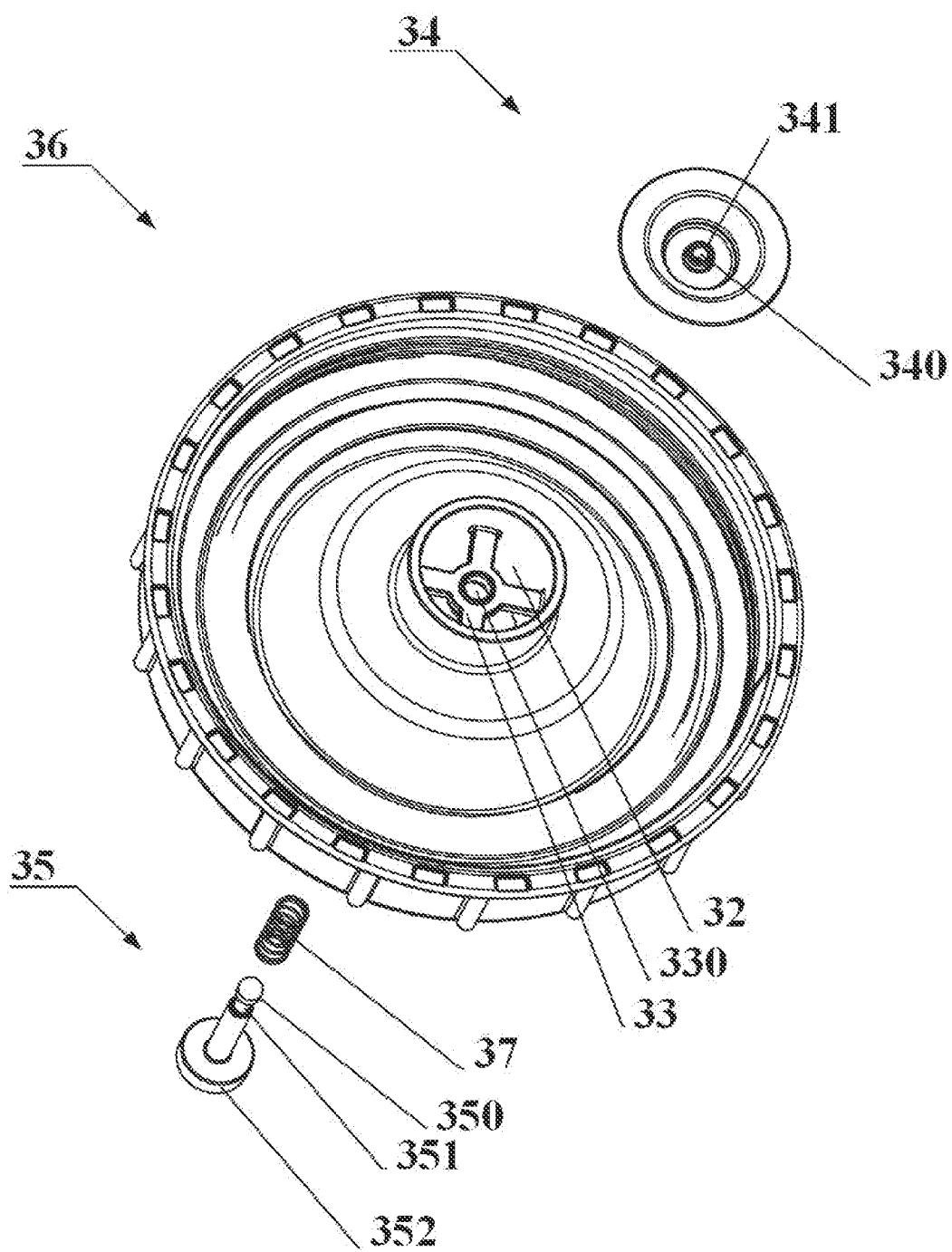
FIG. 15 is an exploded view of the cover body assembly of the first water tank of this nursing machine.
Figure 16:
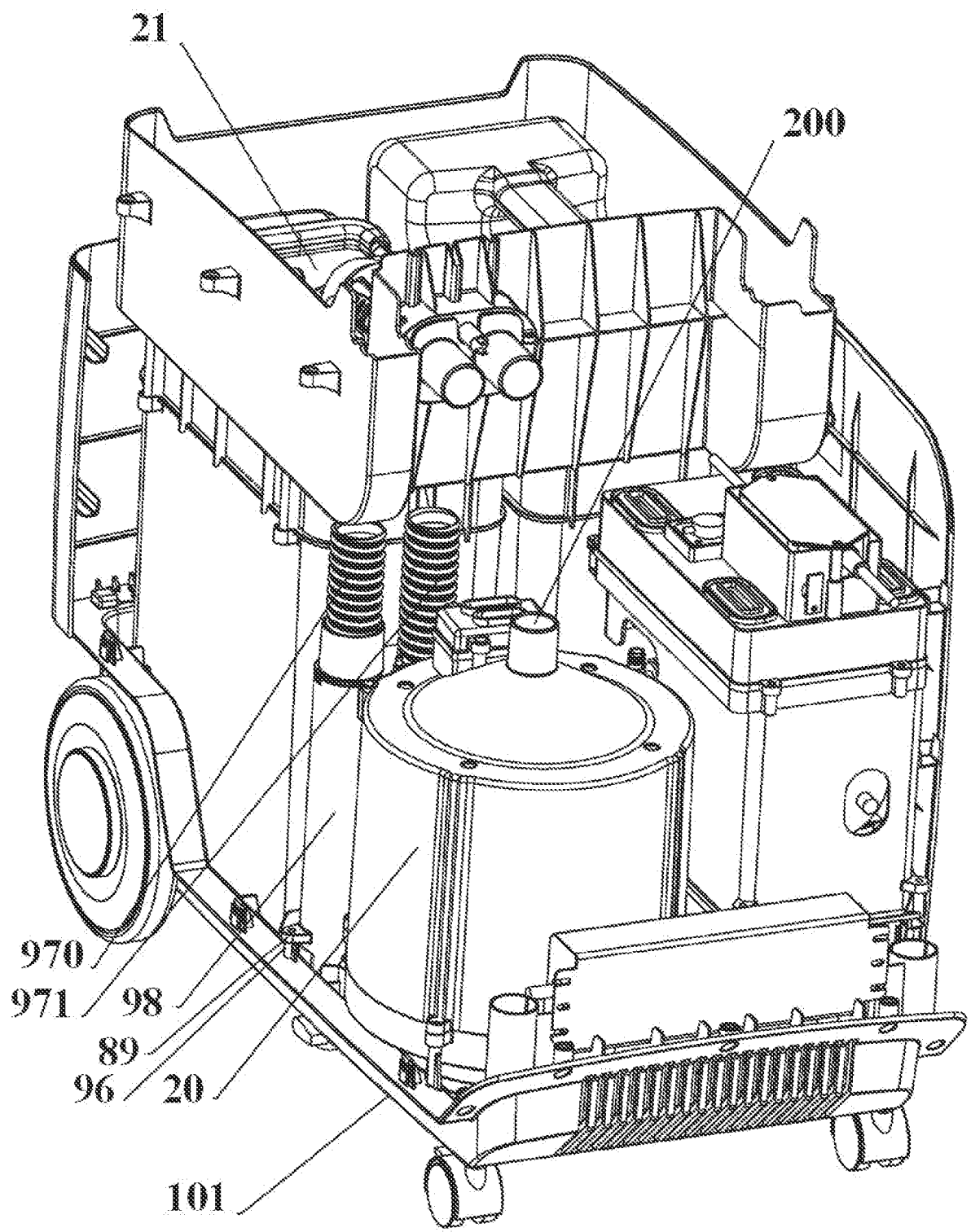
FIG. 16 is a perspective view of one angle of the main unit of this nursing machine of which the upper housing, left housing, and front housing are removed.
Figure 17:
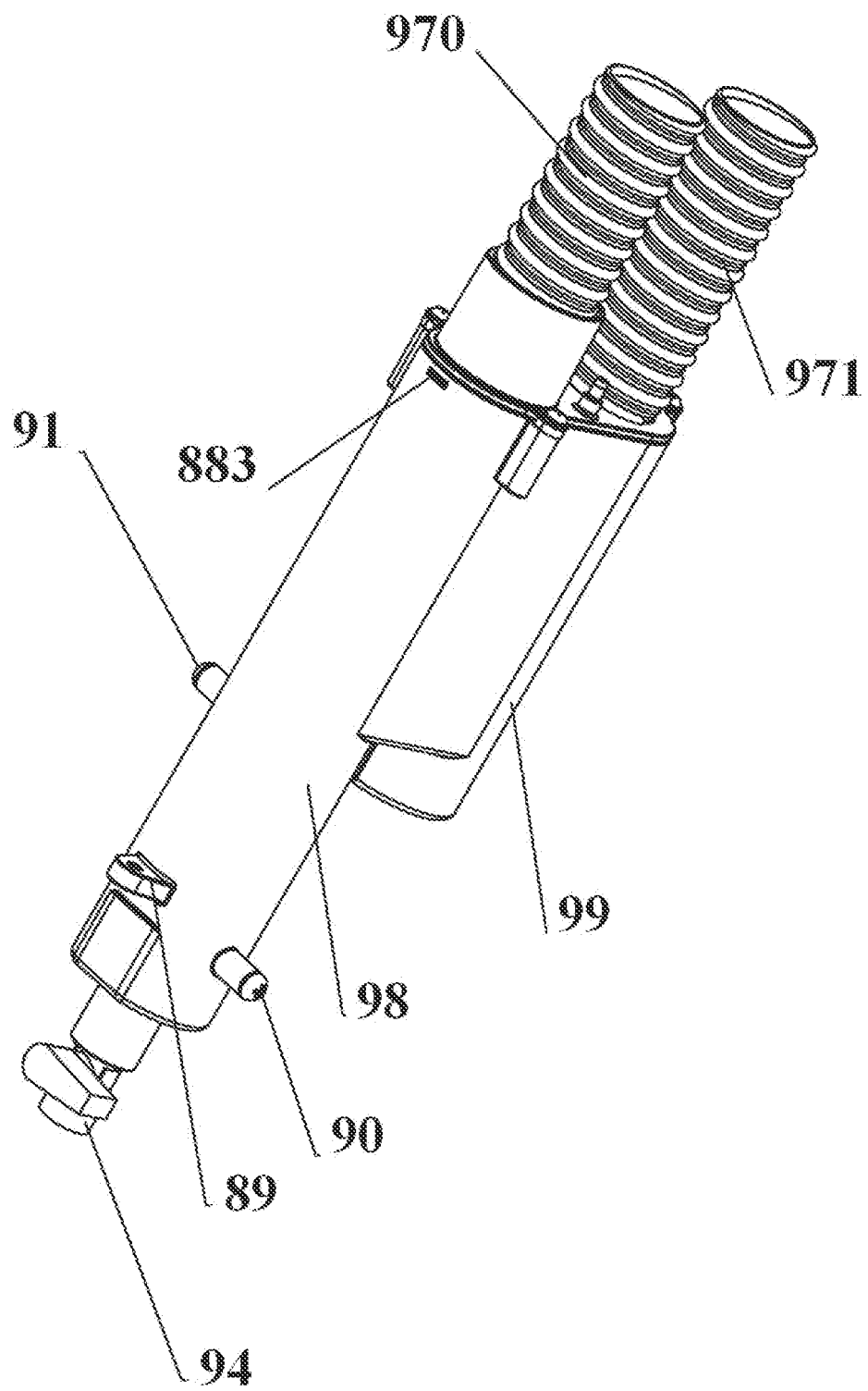
FIG. 17 is a perspective view of the combined state of the water blocking device, the air inlet pipeline, and the air outlet pipeline of the main unit of this nursing machine.
Figure 18:
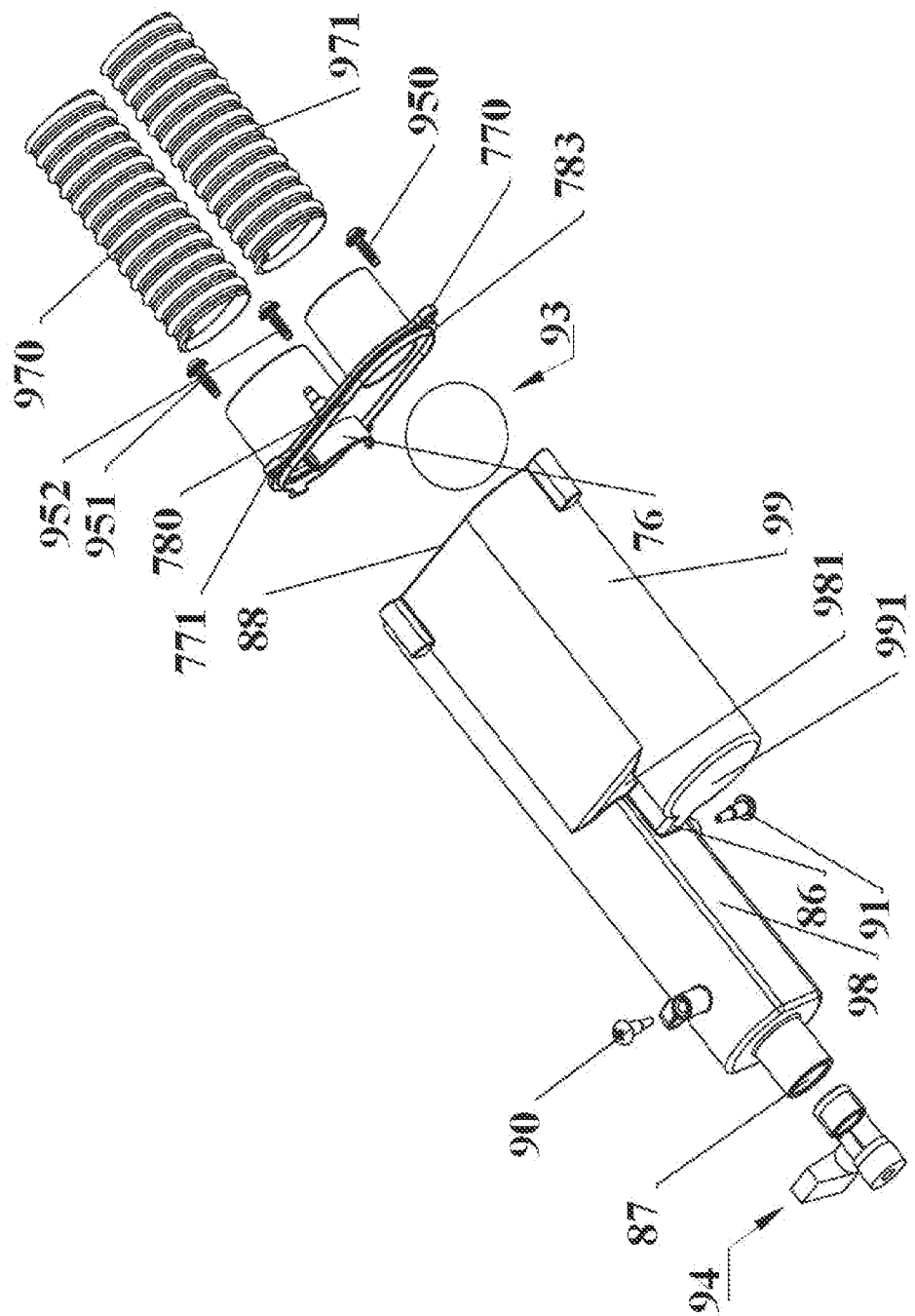
FIG. 18 is an exploded view of FIG. 17.
Figure 19:
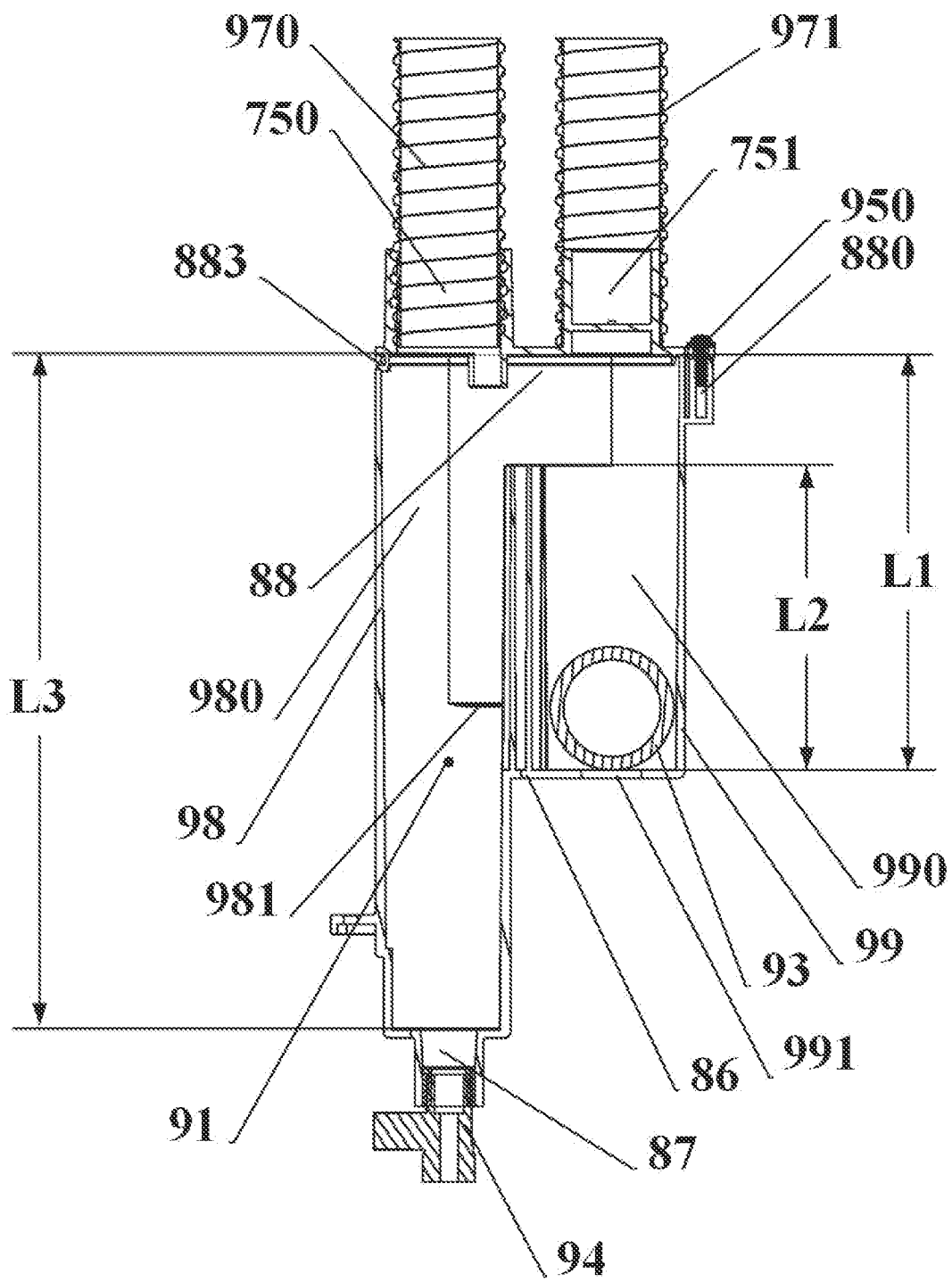
FIG. 19 is a longitudinal sectional view of FIG. 15.
Figure 20:
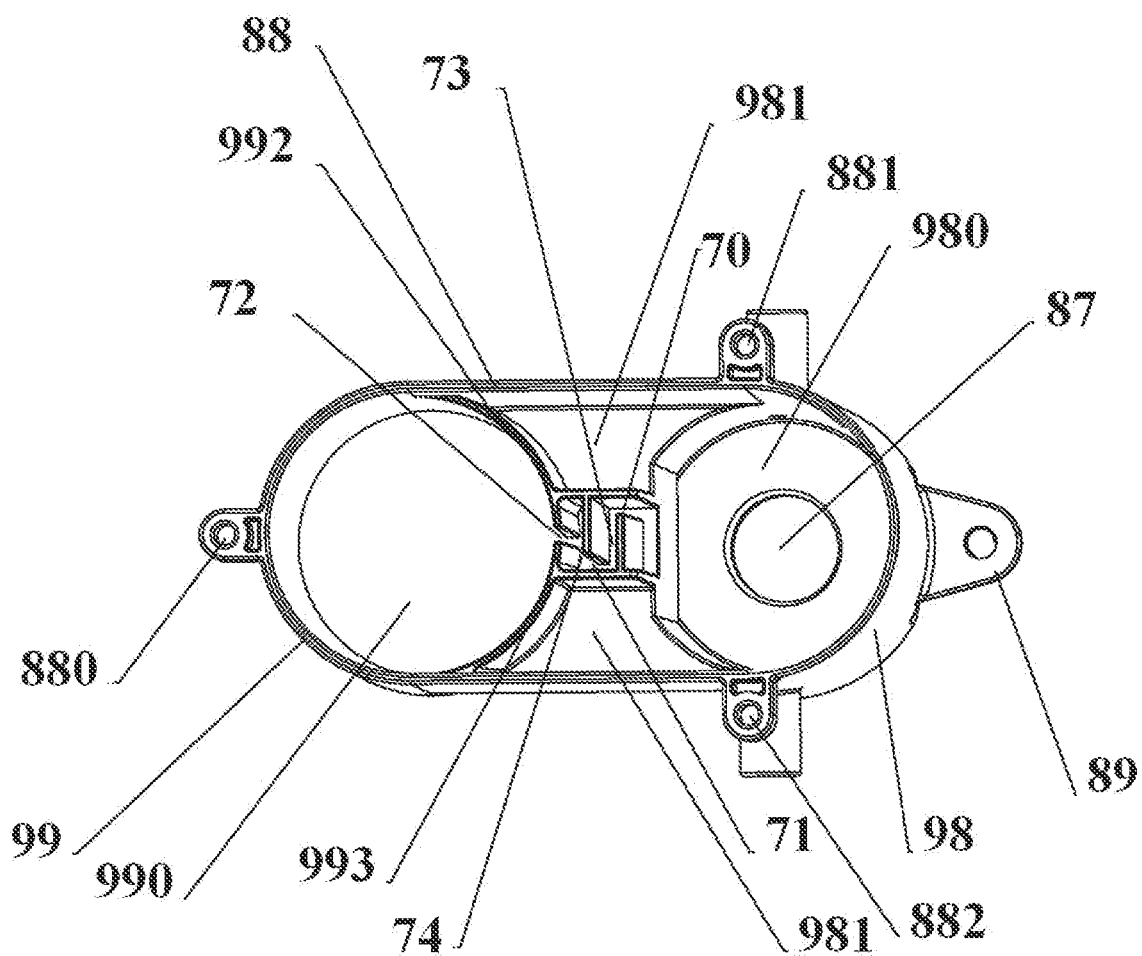
FIG. 20 is a perspective view of the base of the water blocking device of the main unit of this nursing machine.
Figure 21:
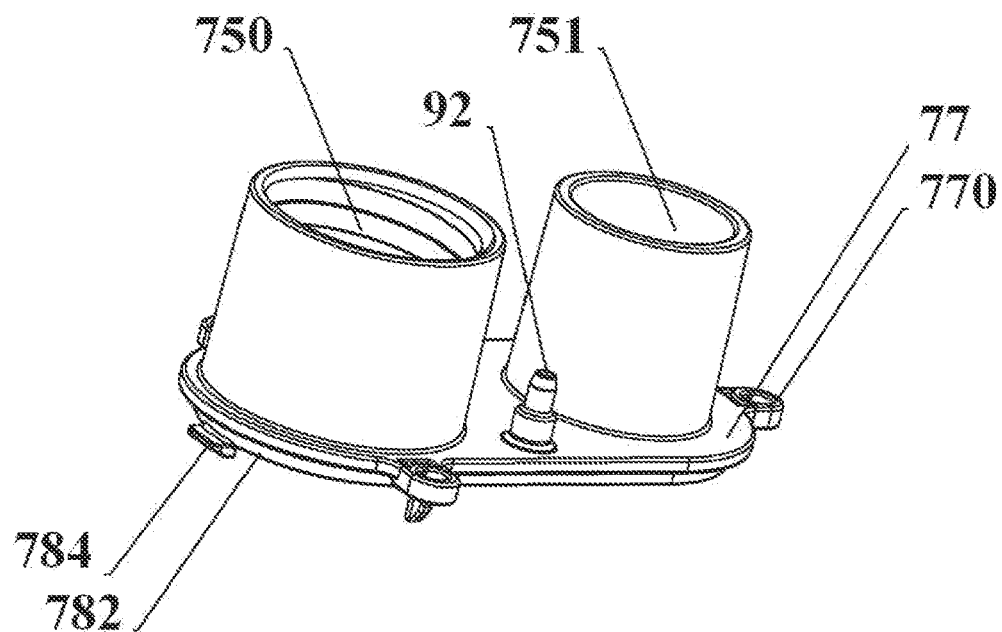
FIG. 21 is a perspective view of one angle of the upper cover of the water blocking device of the main unit of this nursing machine.
Figure 22:
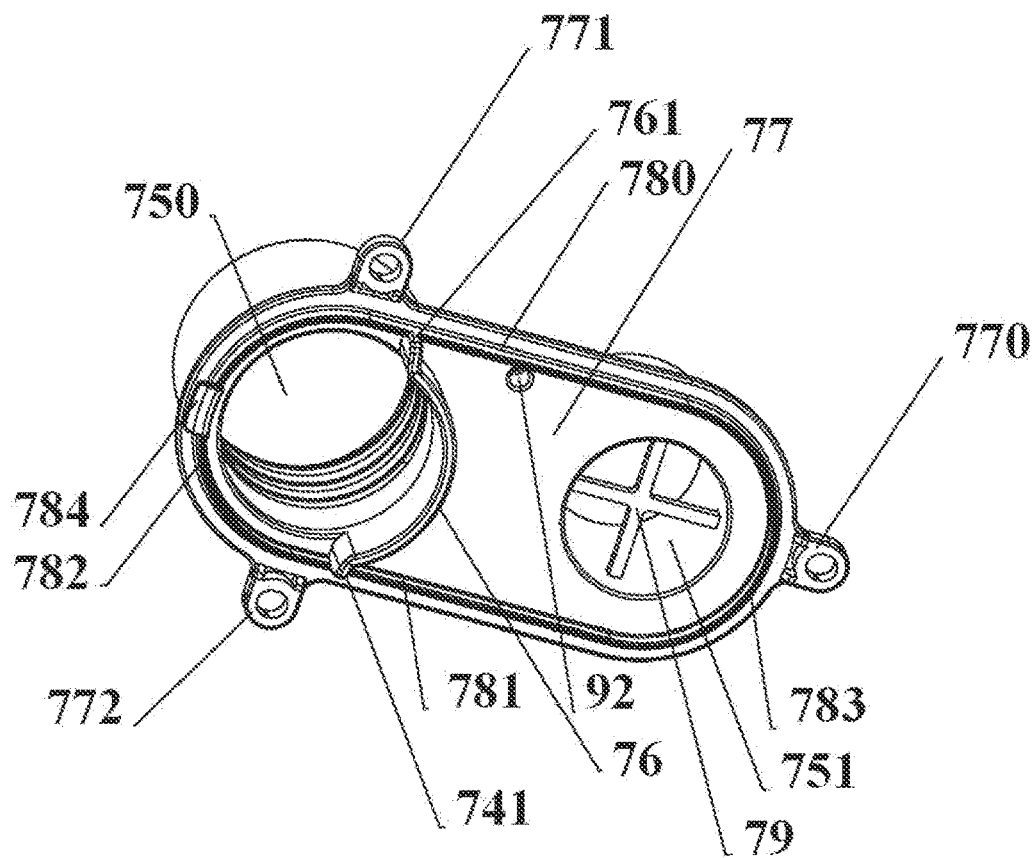
FIG. 22 is a perspective view of another angle of the upper cover of the water blocking device of the main unit of this nursing machine.
Figure 23:
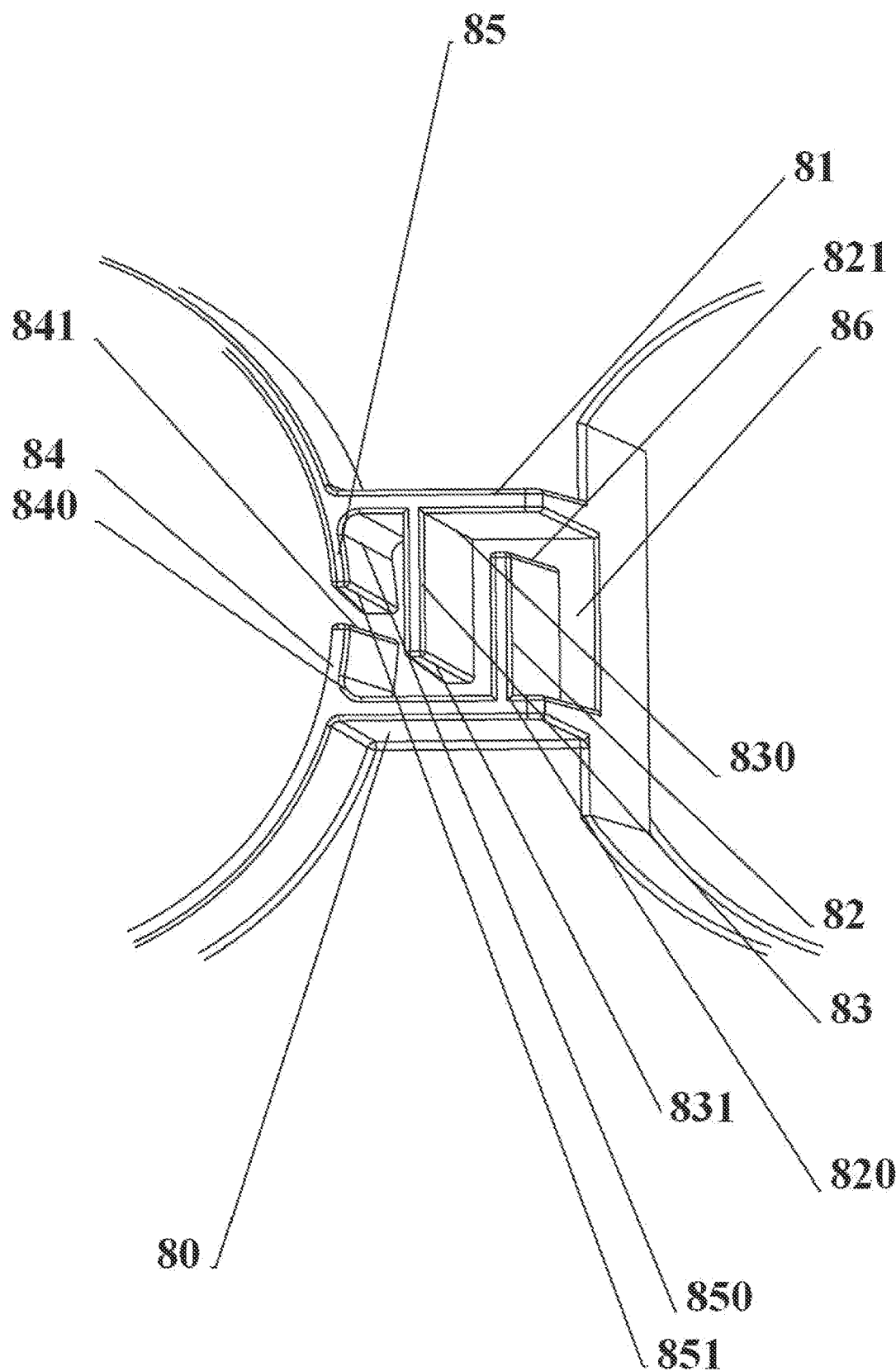
FIG. 23 is a partially enlarged view of FIG. 20.

Referring to FIGS. 1 to 23, the nursing machine provided in the present disclosure is used for automatically cleaning up the excrement of the human body and thus reducing the burden on family members and nursing workers. The nursing machine includes a main unit 10 of the nursing machine, a toilet collector 11 wearable on the human body, pipelines (including a sewage suction pipeline 12 connected between the main unit 10 of the nursing machine and the toilet collector 11, and a water supply pipeline 13 connected between the main unit 10 of the nursing machine and the toilet collector 11) connected between the main unit 10 of the nursing machine and the toilet collector 11, a sewage bucket 21 for accommodating sewage, a water blocking device, an air inlet pipeline 970 communicating the sewage bucket 21 and an air inlet port 750 of the water blocking device, and an air outlet pipeline 971 communicating a negative pressure source 20 and an air outlet port 751 of the water blocking device. The main unit 10 of the nursing machine is provided with a housing 100, a negative pressure source 20 providing suction power for sucking and sewage, a first water tank 3, a second water tank 4, a water pump 22, a second water pump 23, wheels 24, and a push-pull rod 25 for moving the main unit 10 of the nursing machine. The housing 100 includes a chassis 101, an upper housing 102, a left housing 103, a right housing 104, a front housing 105, and a rear housing 106. The negative pressure source 20, the first water tank 3, the second water tank 4, the water pump 22, and the second water pump 23 are located inside the housing 100. The negative pressure source 20, the second water tank 4, the sewage bucket 21, and the water blocking device are disposed on the chassis 101. The negative pressure source 20 includes a motor (not shown) and an impeller (not shown) driven by the motor to rotate. The toilet collector 11 is provided with a toilet tank 110 into which the patient discharges. The negative pressure source 20 includes an air inlet 200, an air outlet (not shown, usually located at the bottom of the negative pressure source 20), a motor (not shown, located inside the negative pressure source 20), and an impeller (not shown, located inside the negative pressure source 20) driven by the motor to rotate. The air inlet pipeline 970 is connected to the air inlet port 750, and sealed with the air inlet port 750 through glue. One end of two opposite ends of the air outlet pipeline 971 is connected to the air outlet port 751, and the other end of the two opposite ends of the air outlet pipeline 971 is connected to the air inlet 200 of the negative pressure source 20. The motor drives the impeller to rotate to generate the suction airflow. The sewage in the toilet tank 110 enters the sewage bucket 21 through the sewage suction pipeline 12 along with the suction airflow. The suction airflow further passes through the air inlet pipeline 970, the water blocking device, the air outlet pipeline 971, and the air inlet 200, enters the negative pressure source 20, and then is discharged out of the negative pressure source 20 through the air outlet.

The first water tank 3 is used for accommodating clean water such as tap water. The second water tank 4 is used for accommodating heated water. The water temperature is moderate and serves as the water source for flushing the private part of the human body and excrement. The water in the second water tank 4 is usually heated to 30-40 degrees. The second water tank 4 is provided with a first water inlet 40 and a first water outlet 41. The main unit 10 of the nursing machine is provided with a replenishment waterway and a circulation waterway. The circulation waterway is fluidly communicated between the first water inlet 40 and the first water outlet 41. The replenishment waterway includes a second waterway and a third waterway, and the circulation waterway includes a first waterway and the preceding third waterway. The water pump 22 joins the third waterway, that is, the water pump 22 is in the third waterway, such that the water pump 22 becomes a node of the third waterway, and the water pump 22 can pump water through the third waterway. The water in the second water tank 4 sequentially flows through the first water outlet 41, the circulation waterway, and the first water inlet 40, and then flows back into the second water tank 4. Further, the water in the second water tank 4 may sequentially flow through the first water outlet 41, the first waterway, the third waterway, and the first water inlet 40, and then flow back into the second water tank 4. The water in the first water tank 3 flows through the replenishment waterway and the first water inlet 40, and then flows into the second water tank 4. Further, the water in the first water tank 3 sequentially flows through the second waterway, the third waterway, and the first water inlet 40, and then flows into the second water tank 4. With this design, the water in the second water tank 4 may sequentially flow through the first water outlet 41, the first waterway, the third waterway, and the first water inlet 40 and then flow back into the second water tank 4, which belongs to the self-circulation of water in the second water tank 4 (abbreviated as water self-circulation). The water in the first water tank 3 may sequentially flow through the second waterway, the third waterway, and the first water inlet 40 and then flow into the second water tank 4, which belongs to the water replenishment from the first water tank 3 to the second water tank 4 (abbreviated as water replenishment). In this manner, the third waterway may be shared by water self-circulation and water replenishment, thereby improving waterway utilization efficiency. In an embodiment, the water in the second water tank 4 sequentially flows through the first water outlet 41, the first waterway, the third waterway, and the first water inlet 40 to flow back into the second water tank 4 under the suction of the water pump 22. The water in the first water tank 3 sequentially flows through the second waterway, the third waterway, and the first water inlet 40 to flow into the second water tank 4 under the suction of the water pump 22.

The main unit 10 of the nursing machine further includes a water shunt valve 5. The water shunt valve 5 is provided with a second water inlet 50, a third water inlet 51, and a second water outlet 52. The first waterway is used for fluidly communicating with the first water outlet 41 and the second water inlet 50, the second waterway is used for fluidly communicating with the first water tank 3 and the third water inlet 51, and the third waterway is used for fluidly communicating with the second water outlet 52 and the first water inlet 40. The water in the second water tank 4 may sequentially flow through the first water outlet 41, the first waterway, the second water inlet 50, the second water outlet 52, the third waterway, and the first water inlet 40, and then flow back into the second water tank 4, and the water in the first water tank 3 may sequentially flow through the second waterway, the third water inlet 51, the second water outlet 52, the third waterway, and the first water inlet 40, and then flow into the second water tank 4. The second water inlet 50 and the third water inlet 51 of the water shunt valve 5 may be opened alternatively, that is, the third water inlet 51 is not opened in the case where the second water inlet 50 is opened; and the second water inlet 50 is not opened in the case where the third water inlet 51 is opened. The water shunt valve 5 is further provided with a fourth water inlet 55. In this embodiment, the water shunt valve 5 is a three-in-and-one-out water shunt valve, that is, the water shunt valve 5 has three water inlets (the second water inlet 50, the third water inlet 51, and the fourth water inlet 55) and one water outlet (the second water outlet 52). Since the fourth water inlet 55 is not connected to the waterway, the fourth water inlet 55 is sealed with glue in this embodiment, which is not limited in the present application.

The main unit 10 of the nursing machine further includes a heater 53 for heating water and a sterilizer 54 for sterilizing water. The water pump 22, the heater 53, the water shunt valve 5, and the sterilizer 54 are located outside the second water tank 4. The sterilizer 54 joins the third waterway, that is, the sterilizer 54 is in the third waterway, such that the sterilizer 54 becomes a node of the third waterway. The heater 53 joins the third waterway, that is, the heater 53 is in the third waterway, such that the heater 53 becomes a node of the third waterway. The water pump 22, the heater 53, and the sterilizer 54 are connected in series between the second water outlet 52 and the first water inlet 40 via the third waterway. The sterilizer 54 can be used for sterilizing the water flowing through, and the water flowing through is the water flowing through the sterilizer 54. The sterilizer 54 may be an ultraviolet sterilizer commonly used on the market, and the specific structure will not be repeated. The heater 53 can be used for heating the water flowing through, and the water flowing through is the water flowing through the heater 53. The heater 53 may be a positive temperature coefficient (PCT) heater commonly used on the market, and the specific structure will not be repeated. The water pump 22 may be a diaphragm pump commonly used on the market, and the specific structure will not be repeated. The second water outlet 52, the water pump 22, the heater 53, and the first water inlet 40 are fluidly connected in sequence via the third waterway. With this design, the water pump 22 is located relatively upstream, and thus the water pump 22 may be connected to the second water outlet 52 relatively more directly and with fewer obstacles, which is convenient for the water pump 22 to pump water more efficiently. The heater 53 is located relatively downstream, and the water just heated in the heater 53 is hotter than the water that has been collected into the second water tank 4. In the condition where the heater 53 is located upstream of the water pump 22, the water just heated in the heater 53 is quickly pumped by the water pump 22, and thus the water pump 22 is easily consumed when the water temperature is relatively high. The first water inlet 40 and the first water outlet 41 are located on opposite sides of the second water tank 4, and the shortest linear distance between the first water inlet 40 and the first water outlet 41 exceeds 15 cm. The second water tank 4 includes a front side wall 420 and a rear side wall 421 that are spaced apart from each other in the front-and-rear direction of the second water tank 4, a left side wall 430 and a right side wall 431 that are spaced apart from each other in the left-and-right direction of the second water tank 4, and a bottom wall 46 connecting the front side wall 420 and the rear side wall 421. The first water inlet 40 is disposed on the front side wall 420, and the first water outlet 41 is disposed on the bottom wall 46 and located at the rear of the bottom wall 46. With this design, the distance between the first water inlet 40 and the first water outlet 41 can be effectively extended. The water in the second water tank 4 may sequentially flow through the first water outlet 41, the first waterway, the second water inlet 50, the second water outlet 52, the third waterway, and the first water inlet 40, and then flow back into the second water tank 4 so that the water circulation is formed. Therefore, in the water circulation process, the water heated by the heater 53 circulates back into the second water tank 4 from the first water inlet 40. In the condition where the first water inlet 40 and the first water outlet 41 are very close, before the water just heated by the heater 53 is sufficiently diffused in the second water tank 4 after entering from the first water inlet 40, more water circulates from the first water outlet 41, and thus the heat diffusion effect of the water heated by the heater 53 and then entering from the first water inlet 410 in the second water tank 4. The water pump 22, the sterilizer 54, the heater 53, and the first water inlet 40 are fluidly connected in sequence via the third waterway. The heater 53 is disposed adjacent to the front side wall 420 and located in front of the front side wall 420. The bottom wall 46 is provided with multiple screw columns 460 for fixing the water pump 22 and the water shunt valve 5.

The main unit 10 of the nursing machine further includes a first water pipe 260. One end of two opposite ends of the first water pipe 260 is connected to the first water outlet 41, and the other end of the two opposite ends of the first water pipe 260 is connected to the second water inlet 50. The first water pipe 260 forms the first waterway. The third waterway includes a second water pipe 261 and a third water pipe 262. One end of two opposite ends of the second water pipe 261 is connected to the second water outlet 52, and the other end of the two opposite ends of the second water pipe 261 is connected to the water inlet 220 of the water pump 22. One end of two opposite ends of the third water pipe 262 is connected to the water outlet 531 of the heater 53, and the other end of the two opposite ends of the third water pipe 262 is connected to the first water inlet 40. The third waterway further includes a fourth water pipe 263 and a fifth water pipe 264. One end of two opposite ends of the fourth water pipe 263 is connected to the water outlet 221 of the water pump 22, and the other end of the two opposite ends of the fourth water pipe 263 is connected to the water inlet 540 of the sterilizer 54. One end of two opposite ends of the fifth water pipe 264 is connected to the water outlet 541 of the sterilizer 54, and the other end of the two opposite ends of the fifth water pipe 264 is connected to the water inlet 530 of the heater 53. In the case where the second water inlet 50 is opened, the third water inlet 51 is closed, and the water pump 22 performs suction, the water in the second water tank 4 sequentially flows through the first water outlet 41, the first waterway, the second water inlet 50, the second water outlet 52, the third waterway, and the first water inlet 40, and then flows back into the second water tank 4. In the case where the second water inlet 50 is closed, the third water inlet 51 is opened, and the water pump 22 performs suction, the water in the first water tank 3 sequentially flows through the second waterway, the third water inlet 51, the second water outlet 52, the third waterway, and the first water inlet 40, and then flows into the second water tank 4.

The main unit 10 of the nursing machine further includes a partition 6 located inside the second water tank 4. The first water tank 3 is placed on the upper side of the partition 6. The second water tank 4 further includes a water storage space 470. The water storage space 470 is formed by the space between the partition 6 and the bottom wall 46. The first water inlet 40 and the first water outlet 41 separately communicate with the water storage space 470. The water in the second water tank 4 is stored in the water storage space 470. The water in the second water tank 4 may flow out of the water storage space 470 from the first water outlet 41, sequentially flow through the first waterway, the second water inlet 50, the second water outlet 52, the third waterway, and the first water inlet 40, and then flow back into the water storage space 470. The water in the first water tank 3 may sequentially flow through the second waterway, the third water inlet 51, the second water outlet 52, the third waterway, and the first water inlet 40 and then flow into the water storage space 470. In the case where the second water inlet 50 is opened, the third water inlet 51 is closed, and the water pump 22 performs suction, the water in the water storage space 470 sequentially flows through the first water outlet 41, the first waterway, the second water inlet 50, the second water outlet 52, the third waterway, and the first water inlet 40, and then flows back into the water storage space 470. In the case where the second water inlet 50 is closed, the third water inlet 51 is opened, and the water pump 22 performs suction, the water in the first water tank 3 sequentially flows through the second waterway, the third water inlet 51, the second water outlet 52, the third waterway, and the first water inlet 40, and then flows into the water storage space 470. The first water tank 3 is at least partially accommodated in the second water tank 4. The first waterway and the third waterway are located outside the second water tank 4. The second waterway extends from the inside of the second water tank 4 through the water storage space 470 to the outside of the second water tank 4.

The partition 6 is provided with a water storage recess 60, and a first transfer port 61 located on the lower side of the water storage recess 60 and communicating with the water storage recess 60. The first water tank 3 is placed upside down. The first water tank 3 is provided with a water outlet port 32 communicating with the water storage recess 60. The water outlet port 32 is located inside the second water tank 4. The lower end 320 of the water outlet port 32 is located inside the water storage recess 60. The water outlet port 32 has a vertical cylindrical shape. The opening of the water outlet port 32 faces downward and toward the water storage recess 60. The water in the first water tank 3 enters the water storage recess 60 through the water outlet port 32. The second water tank 4 is further provided with a second transfer port 48. The first transfer port 61 is connected to the second transfer port 48. The second waterway further includes a sixth water pipe 265. One end of two opposite ends of the sixth water pipe 265 is connected to the second transfer port 48, and the other end of the two opposite ends of the sixth water pipe 265 is connected to the third water inlet 51. The water storage recess 60, the first transfer port 61, the second transfer port 48, and the sixth water pipe 265 are sequentially communicated so that the second waterway is formed. The second transfer port 48 includes an inner section 480 located inside the water storage space 470, and an outer section 481 located outside the second water tank 4 and communicating with the inner section 480. The first transfer port 61 is connected to the inner section 480 of the second transfer port 48. The one end of the two opposite ends of the sixth water pipe 265 is connected to the outer section 481 of the second transfer port 48. The second water tank 4 is further provided with a third water outlet 49. The third water outlet 49 communicates with the water storage space 470. The main unit 10 of the nursing machine further includes a seventh water pipe 266. One end of the seventh water pipe 266 is connected to the water inlet 230 of the second water pump 23, and the other end of the seventh water pipe 266 is connected to the third water outlet 49. The water outlet 231 of the second water pump 23 is connected to a working head through a water supply pipeline 13. Under the suction of the second water pump 23, the water in the water storage space 470 sequentially passes through the third water outlet 49, the seventh water pipe 266, and the water supply pipeline 13, and is supplied to the working head. The second water pump 23 is a diaphragm pump. A sealing ring 610 surrounds the outer periphery of the first transfer port 61. The first transfer port 61 is inserted into the inner section 480 of the second transfer port 48. The first transfer port 61 is sealed with the inner section 480 of the second transfer port 48 through the sealing ring 610. To prevent water leakage in the preceding waterways, the joints should be sealed, that is, the water pipes and the corresponding ports, the water pipes and water inlets, and the water pipes and water outlets should be sealed after the water pipes are connected to the corresponding ports, water inlets, and water outlets. Sealing rings, glue sealing, strapping tight sealing, and other manners may be used. The preceding sealing techniques belong to the common knowledge in this field and will not be repeated. The water pipes 260, 261, 262, 263, 264, 265, and 266 each may be an elastic rubber pipe. The second transfer port 48 is disposed on the bottom wall 46 of the second water tank 4. The inner section 480 of the second transfer port 48 extends upward from the bottom wall 46, and the outer section 481 of the second transfer port 48 extends downward from the bottom wall 46. The upper end of the first transfer port 61 is provided with a filter screen 611. The partition 6 is further provided with a main plate portion 69 in a flat-plate shape, a bottom wall 63 for the water storage recess, and a circumferential wall 64 for the water storage recess. The main plate portion 69 is disposed horizontally. The main plate portion 69 is provided with multiple water leakage through holes 690 penetrating through the upper and lower sides of the main plate portion 69. The bottom wall 63 for the water storage recess 60 and the circumferential wall 64 for the water storage recess 60 hold together to form the water storage recess 60. The first transfer port 61 extends downward from the bottom wall 63 for the water storage recess. The circumferential wall 64 for the water storage recess is cylindrical. The circumferential wall 64 for the water storage recess includes a cylindrical upper part 640 and a cylindrical lower part 641. The upper part 640 extends upward from the main plate portion 69, the lower part 641 extends downward from the main plate portion 69, and the upper part 640 and the lower part 641 are integrated to form the circumferential wall 64 for the water storage recess.

In this embodiment, the replenishment waterway is used for fluidly communicating with the water outlet port 32 of the first water tank 3 and the first water inlet 40. The replenishment waterway extends from the inside of the second water tank 4 through the water storage space 470 to the outside of the second water tank 4. The water in the first water tank 3 flows through the water outlet port 32, the replenishment waterway, and the first water inlet 40, and then flows into the water storage space 470. With this design, the replenishment waterway is partially located inside the second water tank 4 and partially located outside the second water tank 4. The replenishment waterway is located outside the second water tank 4, thereby facilitating the access of the replenishment waterway to the required functional devices, such as the water pump 22, the sterilizer 54, and the heater 53. The water outlet port 32 of the first water tank 3 is located inside the second water tank 4, which is beneficial to prevent the water outlet port 32 from being polluted by external contact. To sum up, the applicability of this design can be improved. The replenishment waterway extends downward from the inside of the second water tank 4 through the water storage space 470 to the outside of the second water tank 4. The sterilizer 54, the heater 53, and the water pump 22 are separately connected to the replenishment waterway. The water in the water storage space 470 sequentially flows through the first water outlet 41, the circulation waterway, and the first water inlet 40, and then flows back into the water storage space 470. In the case where the second water inlet 50 is opened, the third water inlet 51 is closed, and the water pump 22 performs suction, the water in the water storage space 470 sequentially flows through the first water outlet 41, the circulation waterway, and the first water inlet 40, and then flows back into the water storage space 470. In the case where the second water inlet 50 is closed, the third water inlet 51 is opened, and the water pump 22 performs suction, the water in the first water tank 3 sequentially flows through the replenishment waterway and the first water inlet 40, and then flows into the water storage space 470.

The second water tank 4 further includes an accommodation space 471 located above the partition 6, multiple support platforms 44, and multiple first recesses 45 corresponding to the support platforms 44. The first water tank 3 is placed upside down in the accommodation space 471. The support platforms 44 protrude into the second water tank 4 so that the first recesses 45 that are recessed into the second water tank 4 are formed outside the second water tank 4. The support platforms 44 separate the water storage space 470 from the first recesses 45. The first water tank 3 is at least partially accommodated in the accommodation space 471. The accommodation space 471 is separated from the water storage space 470 by the partition 6. The partition 6 is located below the first water tank 3 and supports the first water tank 3. The support platforms 44 are located below the partition 6 and support the partition 6. Each support platform 44 includes a support wall 440 supporting the partition 6, and a longitudinal wall 441 extending upward from the bottom wall 46. The bottom wall 46 is disposed horizontally. The longitudinal wall 441 is perpendicular to the bottom wall 46. The longitudinal wall 441 is integrally connected to the support wall 440 and the bottom wall 46. The support wall 440 is disposed horizontally, the main plate portion 69 is disposed horizontally, and the longitudinal wall 441 is perpendicular to the main plate portion 69. The partition 6 separates the water storage space 470 and the accommodation space 471. The water storage space 470 below the partition 6 is used for storing water, and the accommodation space 471 above the partition 6 is used for accommodating the first water tank 3, which is beneficial to space-saving and space utilization optimization. The support platforms 44 can effectively and indirectly support the first water tank 3 through the partition 6, which is beneficial to the stable position of the first water tank 3. To sum up, the arrangement of the first water tank 3, the second water tank 4, and the partition 6 can be optimized. The partition 6 is provided with multiple convex ribs 65 protruding downward and toward the corresponding support platforms 44, and reinforcing ribs 66 connected between the convex ribs 65. The convex ribs 65 are supported on the support platforms 44.

The partition 6 is provided with multiple support pads 67. Each support pad 67 is located above a respective support platform 44. The first water tank 3 is supported on the support pads 67 of the partition 6. With this design, the weight-bearing position of the partition 6 (the position that bears the weight of the first water tank 3, that is, the position of each support pad 67) basically corresponds to a respective support platform 44 supporting the partition 6 in the up-and-down direction, so that the upper pressure acting on the partition 6 is basically aligned with the lower support force acting on the partition 6 in the up-and-down direction, and thus the deformation amount of the partition 6 under load can be reduced. The support pads 67 are made of rubber. Each support pad 67 is provided with a main body portion 670 and a positioning column. The main body portion 670 has a disc shape. The positioning column extends downward from the main body portion 670 in an integral manner. The partition 6 is provided with positioning holes 680. Each positioning column is installed in a respective positioning hole 680. Each positioning column is partially accommodated in a respective positioning hole 680. Each positioning column is provided with a neck (not shown) and a head 672. The neck of each support pad 67 extends downward from the main body portion 670 in an integral manner. The head 672 is integrally connected to the neck of each support pad 67 and is located on the lower side of the neck of each support pad 67. The radial size of the head 672 is greater than the radial size of the neck of each support pad 67. The neck of each support pad 67 is located in a respective positioning hole 680. The head 672 passes through a respective positioning hole 680 and the radial size of the head 672 is greater than the radial size of a respective positioning hole 680, so that the head 672 is limited to be outside a respective positioning hole 680. The head 672 is accommodated in the space 650 surrounded by the convex ribs 65. The head 672 of each positioning column is located above a respective support platform 44. Each positioning column extends downward and beyond a respective positioning hole 680. The head 672 has a cone shape. Each positioning column is inserted downward into a respective positioning hole 680. Each positioning column extends downward and toward a respective support platform 44. The head 672 of each positioning column is spaced apart from a respective support platform 44 in the up-and-down direction. The head 672 of each positioning column 672 is located between a respective positioning hole 680 and a respective support platform 44. Each support platform 44 is disposed at a respective corner of the second water tank 4, each support pad 67 is disposed at a respective corner of the partition 6, and each support platform 44 is upwardly supported at a respective corner of the partition 6. The numbers of the first recesses 45, the support platforms 44, and the support pads 67 are 4, 4, and 4, respectively. The partition 6 is further provided with a poka-yoke notch 681 at the edge of the partition 6 and penetrating through the upper and lower sides of the partition 6. The second water tank 4 is provided with a poka-yoke protrusion 432 matching the poka-yoke notch 681, and a second recess 434 corresponding to the poka-yoke protrusion 432. The poka-yoke protrusion 432 protrudes into the second water tank 4 so that the second recess 434 that is recessed into the second water tank 4 is formed outside the second water tank 4. The poka-yoke notch 681 and the poka-yoke protrusion 432 are used for assisting the partition 6 to be correctly installed into the second water tank 4. The poka-yoke protrusion 432 extends vertically. The lower end of the poka-yoke protrusion 432 is integrally connected to the bottom wall 46. The upper end of the poka-yoke protrusion 432 is higher than the support platforms 44. The lower ends of the support platforms 44 are integrally connected to the bottom wall 46. The poka-yoke protrusion 432 protrudes from one of the front side wall 420, the rear side wall 421, the left side wall 430, and the right side wall 431 toward the second water tank 4. In this embodiment, the poka-yoke protrusion 432 is located on the left side wall 430, and the upper end of the poka-yoke protrusion 432 is provided with an inclined guide wall 433 used for guiding the assembly of the poka-yoke protrusion 432 and the poka-yoke notch 681.

The first water tank 3 includes a box body 30, a handle 31 located on the upper part of the box body 30, and a cover body assembly installed at the lower part of the box body 30. The cover body assembly is at least partially accommodated in the water storage recess 60. The water outlet port 32 is disposed on the cover body assembly and forms a part of the cover body assembly; and the handle 31 is located outside the second water tank 4. The partition 6 is further provided with an up pushing portion 630 extending upward from the bottom wall 63 for the water storage recess. The cover body assembly is provided with a bracket 33 located in the water outlet port 32, a stopper 34 for blocking the water outlet port 32, and a connecting rod 35 combined with the stopper 34 to drive the stopper 34 to move. The water outlet port 32 and the bracket 33 are respectively disposed on the cover body 36 of the cover body assembly and form a part of the cover body 36, and the cover body 36 has a disc shape. The box body 30 is provided with a round box opening 300. The cover body 36 is installed on the box opening 300. The cover body 36 is threadedly fixed to the box opening 300. The box opening 300 is provided with external threads. The cover body 36 is provided with internal threads 360 that are screwed with the external threads of the box opening 300. The stopper 34 is located above the bracket 33. The connecting rod 35 passes through the bracket 33. The bracket 33 is cross-shaped. The center of the bracket 33 is provided with a first through hole 330 for the connecting rod 35 to pass through. The up pushing portion 630 is used for lifting the connecting rod 35 upward so that the connecting rod 35 drives the stopper 34 to leave the water outlet port 32, and thus the water outlet port 32 is opened. The up pushing portion 630 is rod-shaped, and the up pushing portion 630 is a hollow rod so that water lock in injection molding can be reduced. The connecting rod 35 includes a head 350 at one end of the connecting rod 35, and a neck 351 integrally connected to the head 350. The radial size of the head 350 is greater than the radial size of the neck 351. The stopper 34 is provided with a second through hole 340 and an elastic retaining ring 341 surrounding the second through hole 340. The neck 351 is located in the second through hole 340, and the retaining ring 341 elastically binds the neck 351, thereby tightening the neck 351, so that the stopper 34 is held on the connecting rod 35. The head 350 passes through the second through hole 340, and the radial size of the head 350 is greater than the radial size of the second through hole 340 so that the head 350 is limited to be outside the second through hole 340. The stopper 34 has a disc shape, and the stopper 34 is made of an elastic material such as rubber. The connecting rod 35 is further provided with a pushed portion 352, and the up pushing portion 630 abuts upward against the pushed portion 352. The cover body assembly is further provided with an elastic member 37 sleeved on the connecting rod 35. The upper end of the elastic member 37 is pressed against the bracket 33. The lower end of the elastic member 37 is pressed against the pushed portion 352. The pushed portion 352 is located at the lower end of the connecting rod 35, and the pushed portion 352 has a circular plate shape. In the case where the first water tank 3 is taken out from the second water tank 4, without the abutting top effect of the up pushing portion 630, the elastic force of the elastic member 37 causes the stopper 34 to return to the original position so that the stopper 34 blocks the upper end of the water outlet port 32, and thus the water outlet port 32 is blocked. The elastic member 376 may be a spring.

During the installation of the partition 6, the poka-yoke notch 681 is aligned with the poka-yoke protrusion 432, the partition 6 is gradually put downward into the second water tank 4 along the poka-yoke protrusion 432, the first transfer port 61 is aligned with the outer section 481 of the second transfer port 48, and the partition 6 is pressed downward so that the first transfer port 61 is inserted into the outer section 481 of the second transfer port 48 until the partition 6 is pressed against the support platforms 44. During specific applications, the first water tank 3 filled with water is placed upside down in the accommodation space 471 and supported on the partition 6, the lower part of the cover body assembly is accommodated in the water storage recess 60, and the up pushing portion 630 lifts the connecting rod 35 upward such that the stopper 34 is moved upward, and thus that the water outlet portion 32 is opened. The water in the first water tank 3 is injected into the water storage recess 60 through the water outlet port 32 (compared with the water dispenser in daily life, the first water tank 3 is equivalent to the pure water bucket placed upside down on the water dispenser, and the water tank at the upper part of the water dispenser is equivalent to the water storage recess 60, the water in the pure water bucket flows out into the water tank of the water dispenser, and equilibrium is gradually reached under atmospheric pressure; after the equilibrium, the pure water bucket no longer discharges water to the water tank of the water dispenser unless someone takes water to drink, causes the water in the water tank of the water dispenser to decrease and thus the equilibrium is broken, and then the water in the pure water bucket is further replenished into the water tank of the water dispenser). In the case where the second water tank 4 is not replenished, the replenishment waterway is closed, the water in the water storage recess 60 submerges the lower part of the cover body assembly and the lower end 320 of the water outlet port 32, and the first water tank 3 does not discharge water under the action of atmospheric pressure. To make water replenished into the second water tank 4, the third water inlet 51 of the water shunt valve 5 is opened, the second water inlet 50 is closed, and the water pump 22 performs suction (in fact, even if the water pump 22 does not pump water in this case, the water in the first water tank 3 naturally flows into the water storage space 470 through the opened replenishment waterway; the water pump 22 plays a role in enhancing the water output, and the water replenishment amount may be controlled by controlling the opening time of the water pump 22), such that the water in the first water tank 3 sequentially flows through the water outlet port 32, the water storage recess 60, the first transfer port 61, the inner section 480 of the second transfer port 48, the outer section 481 of the second transfer port 48, the sixth water pipe 265, the third water inlet 51, the second water outlet 52, the second water pipe 261, the water pump 22, the fourth water pipe 263, the sterilizer 54, the fifth water pipe 264, the heater 53, the third water pipe 262, and the first water inlet 40, and then flows into the second water tank 4. In the case where the water level in the second water tank 4 reaches the required water level, the water pump 22 may be shut down, the third water inlet 51 may be closed, and thus the water replenishment is stopped. In the case where the water in the second water tank 4 is used and thus the remaining water has a water level lower than a certain water level, the water replenishment may be performed again. During the water replenishment process, the sterilizer 54 sterilizes the water passing through. The heater 53 may not heat the water passing through during the water replenishment process, while the heater 53 heats the water passing through during the self-circulation process of water in the second water tank 4. During the self-circulation of water in the second water tank 4, the second water inlet 50 of the water shunt valve 5 is opened, the third water inlet 51 is closed, the water pump 22 performs suction, and then the water in the second water tank 4 sequentially flows through the first water outlet 41, the first water pipe 260, the second water inlet 50, the second water outlet 52, the second water pipe 261, the water pump 22, the fourth water pipe 263, the sterilizer 54, the fifth water pipe 264, the heater 53, the third water pipe 262, and the first water inlet 40, and then flows back into the second water tank 4; and then the next circulation is performed, and thus the water in the second water tank 4 can continuously self-circulate. During the self-circulation process of water in the second water tank 4, the heater 53 may be turned on to heat the water flowing through, the water circulation and heating may be stopped when the water temperature reaches the required temperature such as 40 degrees, and the water self-circulation and heating may be performed again when the water temperature is lower than a certain temperature such as 30 degrees.

The water pump 22, the water shunt valve 5, the heater 53, and the sterilizer 54 are separately electrically connected to the controller of this nursing machine. The controller controls the opening and closing of the water pump 22, the opening and closing of the heater 53, and the opening and closing of the sterilizer 54, and the controller controls the switching between the water inlet 50 and water inlet 51 of the water shunt valve 5. Since the sterilizer 54 is always turned on for sterilization during the process of water replenishment from the first water tank 3 to the second water tank 4, all the water in the second water tank 4 is sterilized once. In the subsequent self-circulation process of water in the second water tank 4, the sterilizer 54 may be turned on for supplemental sterilization, or the sterilizer 54 may be turned off. Of course, it is also feasible to turn off the heater 53 and the sterilizer 54 during the process of water replenishment from the first water tank 3 to the second water tank 4, but to turn on the heater 53 for heating and turn on the sterilizer 54 for sterilization during the subsequent multiple self-circulation processes of water in the second water tank 4. The heating water tank may be provided with a liquid level detector for monitoring the water level of the heating water tank, and may further be provided with a temperature detector to monitor the water temperature in the heating water tank.

The sewage bucket 21 is located behind the water blocking device, and juxtaposed with the second water tank 4 in the left-and-right direction. The water blocking device includes a float 93 capable of blocking the air outlet port 751 of the water blocking device, a water storage cavity 980, and a float accommodation cavity 990 for accommodating the float 93, and a labyrinth-type channel communicating with the water storage cavity 980 and the float accommodation cavity 990. The air inlet port 750 of the water blocking device corresponds to the water storage cavity 980, and the air inlet port 750 is vertically opposite to and located above the water storage cavity 980. The air outlet port 751 corresponds to the float accommodation cavity 990, and the air outlet port 751 is vertically opposite to and located above the float accommodation cavity 990. The labyrinth-type channel is located between the water storage cavity 980 and the float accommodation cavity 990. Because of labyrinth-type channel, while it can be ensured that the water storage cavity 980 is in transverse communication with the float accommodation cavity 990 through the labyrinth-type channel, the foreign matter in the water storage cavity 980 cannot easily pass through the labyrinth-type channel so that the difficulty of the foreign matter in the water storage cavity 980 entering the float accommodation cavity 990 can be increased, the foreign matter in the water storage cavity 980 can be prevented from entering the float accommodation cavity 990, the possibility of the foreign matter adhering to the float 93 can be effectively reduced, and the adverse effects on the normal floating of the float 93 and normal blocking of the air outlet port 751 due to the foreign matter attachment can be further effectively reduced, and thus the performance of the water blocking device can be improved.

The water blocking device further includes multiple division boards performing separation to form the labyrinth-type channel, each division board extends along the up-and-down direction, and each division board is vertically disposed. The lower end of the float accommodation cavity 990 is flush with the lower end of the labyrinth-type channel so as to be at the same height. The lower end of the float accommodation cavity 990 is flush with the lower end of each division board so as to be at the same height. The labyrinth-type channel includes a first interval 70, a second interval 71, a third interval 72, a fourth interval 73, and a fifth interval 74. The multiple division boards include a first division board 80, a second division board 81, a third division board 82, a fourth division board 83, a fifth division board 84, and a sixth division board 85. The upper ends of the first division board 80, the second division board 81, the third division board 82, the fourth division board 83, the fifth division board 84, and the sixth division board 85 are flush with each other, and the lower ends of the first division board 80, the second division board 81, the third division board 82, the fourth division board 83, the fifth division board 84, and the sixth division board 85 are flush with each other. The first division board 80 is spaced apart from the second division board 81, the third division board 82 is located between the first division board 80 and the second division board 81, and the fourth division board 83 is located between the first division board 80 and the second division board 81. One side 820 of two opposite sides of the third division board 82 is integrally connected to the first division board 80, and the other side 821 of the two opposite sides of the third division board 82 is spaced apart from the second division board 81 so that the first interval 70 is formed therebetween. One side 830 of two opposite sides of the fourth division board 83 is integrally connected to the second division board 81, and the other side 831 of the two opposite sides of the fourth division board 83 is spaced apart from the first division board 80 so that the second interval 71 is formed therebetween. The first division board 80 is parallel to the second division board 81, the third division board 82 is parallel to the fourth division board 83, and the first division board 80 is respectively perpendicular to the third division board 82 and the fourth division board 83.

One side 840 of two opposite sides of the fifth division board 84 is integrally connected to the first division board 80, one side 850 of two opposite sides of the sixth division board 85 is integrally connected to the second division board 81, and the other side 841 of the two opposite sides of the fifth division board 84 is spaced apart from the other side 851 of the two opposite sides of the sixth division board 85 so that the third interval 72 is formed therebetween. The third interval 72 is centrally disposed and roughly located on the midline between the first division board 80 and the second division board 81. The vertical distance between the third interval 72 and the first division board 80 is equal to the vertical distance between the third interval 72 and the second division board 81. The first division board 80, the second division board 81, the third division board 82, the fourth division board 83, the fifth division board 84, and the sixth division board 85 are vertically disposed. The interval between the third division board 82 and the fourth division board 83 forms the fourth interval 73, and the interval between the fourth division board 83 and the sixth division board 85 forms the fifth interval 74. The upper ends of the first interval 70, the second interval 71, the third interval 72, the fourth interval 73, and the fifth interval 74 are flush with each other, and the lower ends of the first interval 70, the second interval 71, the third interval 72, the fourth interval 73, and the fifth interval 74 are flush with each other.

The first interval 70, the second interval 71, and the third interval 72 are sequentially distributed between the water storage cavity 980 and the float accommodation cavity 990. The third division board 82 is located between the float accommodation cavity 990 and the fourth division board 83. The vertical projections of the first interval 70, the second interval 71, and the third interval 72 on a first plane are completely staggered. The first plane is perpendicular to the left-and-right direction. The first plane is a vertical plane parallel to the third division board 82 and the fourth division board 83. The first plane is a virtual plane, which is introduced to facilitate the description of the specific situation where the first interval 70, the second interval 71, and the third interval 72 are staggered. The vertical projection on the first plane requires the projection direction to be perpendicular to the first plane. The first interval 70, the second interval 71, and the third interval 72 separately extend in the up-and-down direction.

The water storage cavity 980, the labyrinth-type channel, and the float accommodation cavity 990 are juxtaposed with each other in the left-and-right direction, and the water storage cavity 980 extends downward beyond the float accommodation cavity 990 and the labyrinth-type channel. The lower end of the float accommodation cavity 990 is flush with the lower end of the labyrinth-type channel. The water blocking device further includes a base and an upper cover disposed on the upper end of the base. The water storage cavity 980 and the float accommodation cavity 990 respectively form a part of the inner cavity of the base. The air inlet port 750 and the air outlet port 751 are respectively formed on the upper cover. The base includes a water storage cup 98 and a float accommodation cup 99. The inner cavity of the water storage cup 98 forms the water storage cavity 980. The inner cavity of the float accommodation cup 99 forms the float accommodation cavity 990. The bottom of the float accommodation cup 99 is provided with a bottom board 991 located below the float accommodation cavity 990. In the case where no water exists in the float accommodation cavity 990, the float 93 falls on the bottom board 991. The base is further provided with a connecting wall 86 connected between the water storage cup 98 and the bottom board 991 and located below the labyrinth-type channel. The first division board 80, the second division board 81, the third division board 82, and the fourth division board 83 respectively extend upward from the connecting wall 86. The bottom board 991 has a flat-plate shape. The connecting wall 86 has a flat-plate shape and is flush with the bottom board 991. The fifth division board 84 and the sixth division board 85 respectively extend upward from the junction of the bottom board 991 and the connecting wall 86. The float accommodation cup 99 is further provided with a first arc-shaped wall 992 and a second arc-shaped wall 993. The first arc-shaped wall 992 and the second arc-shaped wall 993 separate the water storage cavity 980 and the float accommodation cavity 990 are formed. The first arc-shaped wall 992 and the second arc-shaped wall 993 are shared by the water storage cup 98 and the float accommodation cup 99. The water storage cup 98 is further provided with two intermediate walls 981 on opposite sides of the labyrinth-type channel, respectively. The intermediate walls 981 are parallel to the bottom board 991 and the connecting wall 86, and are higher than the bottom board 991 and the connecting wall 86. The first arc-shaped wall 992 extends upward from one of the intermediate walls 981, and the second arc-shaped wall 993 extends upward from the other one of the intermediate walls 981. The lower end of the float accommodation cavity 990 is flush with the lower end of the first interval 70, the lower end of the second interval 71, and the lower end of the third interval 72. The base is further provided with a drain 87. The drain 87 communicates with the water storage cavity 980 and is located below the water storage cavity 980. The water blocking device further includes a faucet 94 installed at the drain 87. The faucet 94 may be an existing general faucet, and the specific structure of the faucet 94 will not be repeated. The faucet 94 is opened so that the liquid accumulated in the water storage cavity 980 can be discharged. The chassis 101 is provided with a screw column 96. The base is provided with a protrusion portion 89 corresponding to the screw column 96. A screw (not shown) passes through the protrusion portion 89 and is fastened in the screw column 96 to fix the base to the chassis 101.

The upper cover further includes a baffle 76. The baffle 76 extends downward into the inner cavity of the base. The baffle 76 extends downward beyond the air inlet port 750 and the air outlet port 751. The baffle 76 is located between the air inlet port 750 and the air outlet port 751. The baffle 76 shields one side of the air inlet port 750 relatively close to the air outlet port 751 so that the airflow of the air inlet port 750 needs to bypass the baffle 76 and then flow to the air outlet port 751, which is beneficial to the sewage and the foreign matter carried in the airflow falling into the inner cavity of the base. The upper cover further includes a bottom plate 77 and a ring-shaped retaining rib protruding downward from the bottom plate 77. The air inlet port 750 and the air outlet port 751 respectively penetrate through the bottom plate 77. The ring-shaped retaining rib surrounds the periphery of a combination of the air inlet port 750 and the air outlet port 751. The ring-shaped retaining rib includes a first rib segment 780 and a second rib segment 781 spaced apart from the first rib segment 780 The air inlet port 750 and the air outlet port 751 are located between the first rib segment 780 and the second rib segment 781. The baffle 76 extends downward from the bottom plate 77. One end 760 of two opposite ends of the baffle 76 is integrally connected to the first rib segment 780, and the other end 761 of the two opposite ends of the baffle 76 is integrally connected to the second rib segment 781. The first rib segment 780 and the second rib segment 781 are respectively straight. The ring-shaped retaining rib further includes a third rib segment 782 and a fourth rib segment 783 spaced apart from the third rib segment 782. The third rib segment 782 and the fourth rib segment 783 are respectively arc-shaped. The baffle 76 is located between the third rib segment 782 and the fourth rib segment 783. The third rib segment 782 is connected between the first rib segment 780 and the second rib segment 781. The fourth rib segment 783 is connected between the first rib segment 780 and the second rib segment 781. The third rib segment 782 extends in the direction facing away from the fourth rib segment 783 so that a hook 784 is formed. The shape of ring-shaped retaining rib matches the shape of the upper port 88 of the base and fits into the upper port 88 of the base. The base is provided with a positioning opening 883. The hook 784 is embedded in the positioning opening 883. The periphery of the ring-shaped retaining rib and the base are sealed with glue so that the gap between the bottom plate 77 and the base is sealed, and thus the tightness between the bottom plate 77 and the base can be ensured. The positioning opening 883 is a through hole. The hook 784 and the positioning opening 883 are sealed with glue. The upper cover further includes a cross 79. The cross 79 is located in the air inlet port 750. A sponge block may be disposed on the upper side of the cross 79 within the air inlet port 750 to absorb water. The sponge block is cylindrical and matches the shape of the air inlet port 750. The sponge block may be fixed in the air inlet port 750 with glue.

The base is provided with a first screw hole 880 located outside the periphery of the ring-shaped retaining rib. The water blocking device further includes a first screw 950 for fixing the upper cover and the base. The first screw 950 is threadedly connected to the first screw hole 880. The first screw hole 880 and the positioning opening 883 are located outside the periphery of the ring-shaped retaining rib and on two opposite sides of the upper port 88 of the base. With this arrangement, as long as only one screw, that is the first screw 950, is fastened, the two opposite sides of the cover can be positioned with the two opposite sides of the base in a balanced manner (through the match between the first screw 950 and the first screw hole 880 and in conjunction with the match between the hook 784 and the positioning opening 883 on the other side), the two opposite sides of the upper cover can be respectively positioned with the two opposite sides of the base, which facilitates the subsequent fastening of other screws and optimizes the screw fastening process.

When the upper cover is installed on the base, first, the upper cover on one side where the third rib segment 782 is located is inserted into the upper port 88 of the base and the hook 784 is embedded in the positioning opening 883 so that the upper cover on the one side where the third rib segment 782 is located is roughly positioned relative to the base; second, the upper cover on one side where the fourth rib segment 783 is located is inserted into the upper port 88 of the base, and then the screws (the first screw 950, a second screw 951, and a third screw 952) are enabled to pass through the ears (a first ear 770, a second ear 771, and a third ear 772) on the outer periphery of the bottom plate 77 and to be threadedly connected to the screw holes (the first screw hole 880, a second screw hole 881, and a third screw hole 882) of the base. Considering that the first screw 950 and the first screw hole 880, and the positioning opening 883 are located on the two opposite sides of the upper port 88, respectively, after the first screw 950 is fastened, the upper cover can be initially balanced and positioned on the upper port 88, and then the other two screws can be fastened. In this manner, the installation speed can be accelerated.

The float 93 is spherical. The diameter of the float 93 is 39 mm. The height L1 of the float accommodation cavity 990 is 128 mm. The height L2 of the labyrinth-type channel, the height L2 of the first division board 80, the height L2 of the second division board 81, the height L2 of the third division board 82, the height L2 of the fourth division board 83, the height L2 of the fifth division board 84, and the height L2 of the sixth division board 85 are 95 mm. The height L1 of the water storage cavity 980 is 208 mm. The float 93 of appropriate weight may be selected according to the suction force in the case where the negative pressure source 20 performs suction normally. This embodiment may be configured as follows: as long as the height of the liquid level in the float accommodation cavity 990 rises such that the highest point of the float 93 is roughly flush with each division board, the liquid level and the float 93 are already relatively close to the air outlet port 751 in this case; the negative pressure source 20 can suck up the float 93 normally to cause the float 93 to block the air outlet port 751 so that the liquid accumulated in the water blocking device can be effectively avoided from being pumped up. The preceding sizes and configurations are only one example, and those skilled in the art can easily adjust the sizes and configurations according to actual needs and specific conditions.

The water blocking device further includes a first conductive probe 90 and a second conductive probe 91 respectively exposed in the water storage cavity 980, a first conductive line (not shown) connected to the first conductive probe 90, and a second conductive line 91 (not shown) connected to the second conductive probe 91. The first conductive probe 90 and the second conductive probe 91 are at different heights, and in the case where the liquid collected in the water storage cavity 980 submerges at least part of the first conductive probe 90 and at least part of the second conductive probe 91, the first conductive line is electrically connected to the second conductive line through the first conductive probe 90, the liquid collected in the water storage cavity 980, and the second conductive probe 91 in sequence. In this case, it is indicated that the liquid collected in the water storage cavity 980 reaches a certain height, and the control system may control the nursing machine to issue an alarm to remind the user that the liquid collected in the water storage cavity 980 exceeds the warning line and the water storage cavity 980 needs to be emptied. In an embodiment, the first conductive line and the second conductive line may be wires and may be respectively connected to the control system of this nursing machine. Once the first conductive line is electrically connected to the second conductive line through the first conductive probe 90, the liquid collected in the water storage cavity 980, and the second conductive probe 91, a conductive loop can be formed by the first conductive line, the second conductive line, and the control system and the control system is triggered to issue an alarm. The first conductive probe 90 and the second conductive probe 91 are screws and respectively fastened in the water storage cup 98. The front end of the first conductive probe 90 and the front end of the second conductive probe 91 respectively penetrate into the water storage cavity 980 so as to easily communicate with the liquid collected in the water storage cavity 980. The first conductive probe 90 and the second conductive probe 91 are disposed horizontally. In the present disclosure, the liquid level detection in the water storage cavity 980 can be achieved through the first conductive probe 90 and the second conductive probe 91. The height of the first conductive probe 90 and the height of the second conductive probe 91 are only a little bit higher than the lower end of the float accommodation cavity 990 (by less than 2 mm). After the liquid level in the water storage cavity 980 exceeds the lower end of the float accommodation cavity 990, the liquid level in the water storage cavity 980 is at the same height as the liquid level in the float accommodation cavity 990 due to the communication of the labyrinth-type channel. The float 93 is only a preparatory safety protection measure. In the condition where the liquid level detection achieved by the first conductive probe 90 and the second conductive probe 91 does not fail and the user receives the liquid level alarm and promptly empties the water storage cavity 980, then the float 93 does not block the air outlet port 751. In the case where the liquid level detection achieved by the first conductive probe 90 and the second conductive probe 91 fails, the float 93 can block the air outlet port 751 after the liquid level in the float accommodation cavity 990 reaches a certain height. In this manner, blocking water and preventing overflow can be achieved.

The water blocking device further includes a vent 92 communicating with the inner cavity of the base. The base and the upper cover are fixed together. The vent 92 penetrates the bottom plate 77. The baffle 76 is located between the vent 92 and the air outlet port 751. The air hole 92 is located between the air inlet port 750 and the baffle 76. The main unit 10 of the nursing machine further includes an air guide tube (not shown) and an air pressure detection unit (not shown) for detecting the air pressure in the inner cavity of the base. One end of two opposite ends of the air guide tube is connected to the vent 92, and the other end of the two opposite ends of the air guide tube is connected to the air pressure detection unit so that the air pressure detection unit is able to collect the air pressure in the inner cavity of the base. The air pressure detection unit may adopt the existing art such as pressure detection equipment for detecting tire pressure and the pressure gauge for air compressors, and the specific structure of the air pressure detection unit will not be repeated. In the case where the sewage suction pipeline 12 between the toilet collector 11 and the main unit 10 is blocked and the negative pressure source 20 performs suction normally, the air pressure in the inner cavity of the base is relatively low, it may be set as follows: when the air pressure detection unit detects the air pressure in the inner cavity of the base is lower than a certain value, the control system of the main unit of the nursing machine issues a warning to remind the user that the upstream pipeline of the water blocking device is blocked (for example, the sewage suction pipeline 12 is blocked), and then the user needs to check whether the upstream pipeline of the water blocking device is blocked.

The above is only the specific embodiment of the present disclosure, but the scope of the present disclosure is not limited thereto, and those skilled in the art should understand that the present disclosure includes but is not limited to the drawings and the contents described in the above specific embodiment. Any modifications which do not depart from the functional and structural principles of the present disclosure are intended to be included within the scope of the claims.

What is claimed is:

1. A main unit of a nursing machine, comprising a first water tank, a second water tank, a water pump, a first waterway, a second waterway, and a third waterway,
   wherein the second water tank is provided with a first water inlet and a first water outlet, and the water pump joins the third waterway, water in the second water tank is able to sequentially flow through the first water outlet, the first waterway, the third waterway, and the first water inlet to flow back into the second water tank, and water in the first water tank sequentially flows through the second waterway, the third waterway, and the first water inlet to flow into the second water tank, and the first water tank is at least partially accommodated in the second water tank; the second water tank is further provided with a water storage space, and the water storage space is located below the first water tank; the first water inlet and the first water outlet are configured to respectively communicate with the water storage space; and the second waterway extends from an inside of the second water tank through the water storage space to an outside of the second water tank.

2. The main unit of the nursing machine of claim 1, further comprising a water shunt valve, wherein the water shunt valve is provided with a second water inlet, a third water inlet, and a second water outlet;

wherein the first waterway is configured to fluidly communicate with the first water outlet and the second water inlet, the second waterway is configured to fluidly communicate with the first water tank and the third water inlet, and the third waterway is configured to fluidly communicate with the second water outlet and the first water inlet, the water in the second water tank is able to sequentially flow through the first water outlet, the first waterway, the second water inlet, the second water outlet, the third waterway, and the first water inlet to flow back into the second water tank, and the water in the first water tank sequentially flows through the second waterway, the third water inlet, the second water outlet, the third waterway, and the first water inlet to flow into the second water tank; and wherein the second water inlet and the third water inlet of the water shunt valve are opened alternatively.

3. The main unit of the nursing machine of claim 2, further comprising a heater for heating water and a sterilizer for sterilizing the water, wherein the water pump, the heater, the water shunt valve, and the sterilizer are located outside the second water tank, and the water pump, the heater, and the sterilizer are connected in series between the second water outlet and the first water inlet via the third waterway.

4. The main unit of the nursing machine of claim 2, further comprising a heater for heating water, wherein the heater joins the third waterway, and the heater is configured to heat the water flowing through the third waterway; and wherein the second water tank comprises a front side wall, a rear side wall spaced apart from the front side wall in a front-and-rear direction of the second water tank, and a bottom wall connected with the front side wall and the rear side wall; and the first water inlet is disposed on the front side wall, and the first water outlet is disposed on the bottom wall and located at a rear of the bottom wall.

5. The main unit of the nursing machine of claim 2, wherein in a case where the second water inlet is opened, the third water inlet is closed, and the water pump is configured to perform suction, the water in the second water tank is able to sequentially flow through the first water outlet, the first waterway, the second water inlet, the second water outlet, the third waterway, and the first water inlet, to flow back into the second water tank; and in a case where the second water inlet is closed, the third water inlet is opened, and the water pump is configured to perform suction, the water in the first water tank is able to sequentially flow through the second waterway, the third water inlet, the second water outlet, the third waterway, and the first water inlet to flow into the second water tank.

6. The main unit of the nursing machine of claim 2, wherein the water pump is a diaphragm pump, the water in the second water tank, under suction of the water pump, sequentially flows through the first water outlet, the first waterway, the third waterway, and the first water inlet to flow back into the second water tank; and the water in the first water tank, under the suction of the water pump, sequentially flows through the second waterway, the third waterway, and the first water inlet to flow into the second water tank.

7. The main unit of the nursing machine of claim 2, further comprising a heater for heating water, wherein the water pump, the heater, and the water shunt valve are located outside the second water tank, and the second water outlet, the water pump, the heater, and the first water inlet are fluidly connected in sequence via the third waterway, the water in the second water tank is able to sequentially flow through the first water outlet, the first waterway, the second water inlet, the second water outlet, the water pump, the heater, and the first water inlet to flow back into the second water tank, and the water in the first water tank sequentially flows through the second waterway, the third water inlet, the second water outlet, the water pump, the heater, and the first water inlet to flow into the second water tank, and the water in the second water tank is stored in the water storage space.

8. The main unit of the nursing machine of claim 7, further comprising a sterilizer for sterilizing water flowing through, wherein the water pump, the sterilizer, and a heater are fluidly connected in sequence via the third waterway, the water in the second water tank is able to sequentially flow through the first water outlet, the first waterway, the second water inlet, the second water outlet, the water pump, the sterilizer, the heater, and the first water inlet to flow back into the second water tank, and the water in the first water tank sequentially flows through the second waterway, the third water inlet, the second water outlet, the water pump, the sterilizer, the heater, and the first water inlet to flow into the second water tank.

9. The main unit of the nursing machine of claim 2, further comprising a first water pipe and a heater, wherein the first water pipe forms the first waterway; one end of two opposite ends of the first water pipe is connected to the first water outlet, and another end of the two opposite ends of the first water pipe is connected to the second water inlet;

wherein the third waterway comprises a second water pipe and a third water pipe; one end of two opposite ends of the second water pipe is connected to the second water outlet, and another end of the two opposite ends of the second water pipe is connected to a water inlet of the water pump; and one end of two opposite ends of the third water pipe is connected to a water outlet of the heater, and another end of the two opposite ends of the third water pipe is connected to the first water inlet.

10. The main unit of the nursing machine of claim 9, further comprising a sterilizer, wherein the third waterway comprises a fourth water pipe and a fifth water pipe;

wherein one end of two opposite ends of the fourth water pipe is connected to a water outlet of the water pump, and another end of the two opposite ends of the fourth water pipe is connected to a water inlet of the sterilizer; and one end of two opposite ends of the fifth water pipe is connected to a water outlet of the sterilizer, and another end of the two opposite ends of the fifth water pipe is connected to a water inlet of the heater.

11. The main unit of the nursing machine of claim 2, further comprising a partition located inside the second water tank,
wherein the first water tank is placed on an upper side of the partition; the second water tank further comprises a bottom wall located below the partition, and the water storage space is formed by space between the partition and the bottom wall of the second water tank, the water in the second water tank is able to flow out of the water storage space from the first water outlet, and then sequentially flows through the first waterway, the second water inlet, the second water outlet, the third waterway, and the first water inlet to flow back into the water storage space.

12. The main unit of the nursing machine of claim 11, wherein the first waterway, the third waterway, the water pump, and the water shunt valve are located outside the second water tank, the water in the first water tank is able to sequentially flow through the second waterway, the third water inlet, the second water outlet, the third waterway, and the first water inlet to flow into the water storage space.

13. The main unit of the nursing machine of claim 12, wherein the partition is provided with a water storage recess, and a first transfer port located on a lower side of the water storage recess and communicating with the water storage recess;
wherein the first water tank is placed upside down, the first water tank is provided with a water outlet port communicating with the water storage recess, the water outlet port is located inside the second water tank, a lower end of the water outlet port is located inside the water storage recess, the water in the first water tank is able to enter the water storage recess through the water outlet port;
wherein the second water tank is further provided with a second transfer port, and the first transfer port is connected to the second transfer port; the second waterway further comprises a sixth water pipe, one end of two opposite ends of the sixth water pipe is connected to the second transfer port, and another end of the two opposite ends of the sixth water pipe is connected to the third water inlet; and the water storage recess, the first transfer port, the second transfer port, and the sixth water pipe are sequentially communicated so that the second waterway is formed.

14. The main unit of the nursing machine of claim 13, wherein the second transfer port comprises an inner section located inside the water storage space, and an outer section located outside the second water tank and communicating with the inner section;
wherein the first transfer port is connected to the inner section of the second transfer port, and the one end of the two opposite ends of the sixth water pipe is connected to the outer section of the second transfer port; the inner section of the second transfer port extends upward from the bottom wall of the second water tank, and the outer section of the second transfer port extends downward from the bottom wall of the second water tank.

15. The main unit of the nursing machine of claim 14, wherein the first water tank comprises a box body, and a cover body assembly installed at a lower part of the box body;
wherein the cover body assembly is at least partially accommodated in the water storage recess, and the water outlet port is disposed on the cover body assembly; the cover body assembly is further provided with a bracket located in the water outlet port, a stopper for blocking the water outlet port, and a connecting rod combined with the stopper to drive the stopper to move; the stopper is located above the bracket, and the connecting rod passes through the bracket;
wherein the partition is further provided with a bottom wall for the water storage recess, a circumferential wall for the water storage recess, and an up pushing portion for lifting the connecting rod upward; the bottom wall for the water storage recess and the circumferential wall for the water storage recess enclose the water storage recess, the up pushing portion extends upward from the bottom wall for the water storage recess, and the first transfer port extends downward from the bottom wall for the water storage recess.

16. The main unit of the nursing machine of claim 14, further comprising a negative pressure source for providing suction power for sucking sewage, a sewage bucket for accommodating the sewage, a water blocking device, an air inlet pipeline communicating with the sewage bucket and an air inlet port of the water blocking device, and an air outlet pipeline communicating with the negative pressure source and an air outlet port of the water blocking device,
wherein the water blocking device comprises a float capable of blocking the air outlet port, a water storage cavity, and a float accommodation cavity for accommodating the float; the air inlet port is vertically opposite to and located above the water storage cavity, and the air outlet port is vertically opposite to and located above the float accommodation cavity;
wherein the water blocking device further comprises a labyrinth-type channel communicating with the water storage cavity and the float accommodation cavity, and a plurality of division boards extending up and down and being spaced arranged to form the labyrinth-type channel; and
wherein the labyrinth-type channel is located between the water storage cavity and the float accommodation cavity, and configured to communicate between the water storage cavity and the float accommodation cavity.

17. The main unit of the personal care machine of claim 16, wherein the water storage cavity, the labyrinth-type channel, and the float accommodation cavity are juxtaposed with each other, a lower end of the float accommodation cavity is flush with a lower end of the labyrinth-type channel and a lower end of each of the plurality of division boards, and the water storage cavity extends downward beyond the labyrinth-type channel;
wherein the labyrinth-type channel is provided with a first interval, a second interval, and a third interval; wherein the first interval, the second interval, and the third interval all extend up and down; the first interval, the second interval, and the third interval are formed by intervals between different ones of the plurality of division boards, and vertical projections of the first interval, the second interval, and the third interval on a first plane are completely staggered, wherein the first plane is perpendicular to a left-and-right direction of the labyrinth-type channel; and wherein the sewage bucket is located behind the water blocking device and juxtaposed with the second water tank in a left-and-right direction of the second water tank.

18. The main unit of the nursing machine of claim 17, wherein the water storage cavity is in transverse communication with the float accommodation cavity through the labyrinth-type channel; the plurality of division boards comprise a first division board, a second division board, a third division board, a fourth division board, a fifth division board, and a sixth division board, wherein the first division board is parallel to the second division board and spaced apart from the second division board in a front-and-rear direction of the labyrinth-type channel, the third division board is parallel to the fourth division board, and the first division board is perpendicular to the third division board;

wherein one side of two opposite sides of the third division board is integrally connected to the first division board, and another side of the two opposite sides of the third division board is spaced apart from the second division board so that the first interval is formed between the third division board and the second division board; one side of two opposite sides of the fourth division board is integrally connected to the second division board, and another side of the two opposite sides of the fourth division board is spaced apart from the first division board so that the second interval is formed between the fourth division board and the first division board; one side of two opposite sides of the fifth division board is integrally connected to the first division board, one side of two opposite sides of the sixth division board is integrally connected to the second division board, and another side of the two opposite sides of the fifth division board is spaced apart from another side of the two opposite sides of the sixth division board so that the third interval is formed between the fifth division board and the sixth division board;

wherein the third division board, the fourth division board, the fifth division board, and the sixth division board are respectively located between the first division board and the second division board, the third division board is located between the float accommodation cavity and the fourth division board, the fourth division board is located between the third division board and the third interval, and the first plane is a vertical plane parallel to the third division board and the fourth division board; and the lower end of the float accommodation cavity is flush with a lower end of the first interval, a lower end of the second interval, and a lower end of the third interval.

19. The main unit of the nursing machine of claim 18, further comprising an air guide tube and an air pressure detection unit for detecting air pressure in an inner cavity of a base, wherein the water blocking device further comprises the base, an upper cover disposed on an upper end of the base, a vent communicating with the inner cavity of the base; wherein the base comprises a water storage cup and a float accommodation cup, an inner cavity of the water storage cup forms the water storage cavity, an inner cavity of the float accommodation cup forms the float accommodation cavity, one end of two opposite ends of the air guide tube is connected to the vent, and another end of the two opposite ends of the air guide tube is connected to the air pressure detection unit; and wherein the upper cover further comprises a bottom plate and a baffle, the baffle extends downward into the base, the baffle extends downward beyond the air inlet port and the air outlet port, the baffle is located between the air inlet port and the air outlet port, and the baffle shields one side of the air inlet port relatively close to the air outlet port; the air inlet port, the air outlet port, and the vent respectively penetrate through the bottom plate, the baffle is located between the vent and the air outlet port, and the vent is located between the air inlet port and the baffle.

20. A nursing machine comprising the main unit of the nursing machine of claim 1.

\* \* \* \* \*